(12) United States Patent
Li et al.

(10) Patent No.: US 10,659,813 B2
(45) Date of Patent: May 19, 2020

(54) METHOD, SYSTEM AND DEVICE FOR CODING AND DECODING DEPTH INFORMATION

(71) Applicant: ZTE Corporation, Shenzhen, Guangdong (CN)

(72) Inventors: Hongwei Li, Shenzhen (CN); Ming Li, Shenzhen (CN); Ping Wu, Shenzhen (CN); Guoqiang Shang, Shenzhen (CN); Yutang Xie, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 489 days.

(21) Appl. No.: 14/783,852

(22) PCT Filed: Mar. 25, 2014

(86) PCT No.: PCT/CN2014/074050
§ 371 (c)(1),
(2) Date: Oct. 10, 2015

(87) PCT Pub. No.: WO2014/166334
PCT Pub. Date: Oct. 16, 2014

(65) Prior Publication Data
US 2016/0050439 A1    Feb. 18, 2016

(30) Foreign Application Priority Data

Apr. 10, 2013 (CN) .......................... 2013 1 0123393

(51) Int. Cl.
*H04N 19/176* (2014.01)
*H04N 19/597* (2014.01)
(Continued)

(52) U.S. Cl.
CPC ......... *H04N 19/597* (2014.11); *H04N 13/161* (2018.05); *H04N 19/44* (2014.11)

(58) Field of Classification Search
CPC .. H04N 19/597; H04N 19/44; H04N 13/0048; H04N 19/70; H04N 19/105; H04N 19/46; H04N 19/176
See application file for complete search history.

(56) References Cited

U.S. PATENT DOCUMENTS

2014/0253682 A1* 9/2014 Zhang ................ H04N 13/0048
348/43
2015/0350623 A1* 12/2015 Zhang .................. H04N 19/597
375/240.12
(Continued)

FOREIGN PATENT DOCUMENTS

CN  101990103 A  3/2011
CN  102017627 A  4/2011
(Continued)

OTHER PUBLICATIONS

Fabian Jager, CE6.H related: Results on Updating Mechanism for Coding of Depth Lookup Table (Delta-DLT), Joint Collaborative Team on 3D Video Coding Extensions of ITU-T SG 16 WP 3 and ISO/IEC JTC 1/SC 29/WG 11, 4th Meeting: Incheon, KR, Apr. 2013, JCT3V-D0054, pp. 1-13.
(Continued)

*Primary Examiner* — James T Boylan
*Assistant Examiner* — Patrick E Demosky
(74) *Attorney, Agent, or Firm* — Li & Cai Intellectual Property (USA) Office

(57) ABSTRACT

Disclosed is a method for coding and decoding depth information, and the method includes: data in original Depth Look-up Tables (DLTs) of selected views are combined to establish a unified DLT, a value of the number of elements in the unified DLT and each element in the unified DLT are coded respectively and a coded value and each coded element are transmitted to a decoder; and depth information of each view is coded by taking the unified DLT as a whole
(Continued)

or in portions and coded depth information of each view is transmitted to the decoder. Further disclosed are a system and device for coding and decoding depth information; by means of the disclosure, it is possible to reduce redundancy of coding information and improve coding and decoding efficiency.

6 Claims, 12 Drawing Sheets

(51) Int. Cl.
*H04N 13/161* (2018.01)
*H04N 19/44* (2014.01)

(56) References Cited

U.S. PATENT DOCUMENTS

| | | | |
|---|---|---|---|
| 2016/0007005 A1* | 1/2016 | Konieczny | H04N 19/597 348/43 |
| 2016/0029036 A1* | 1/2016 | Jaeger | H04N 19/597 375/240.12 |

FOREIGN PATENT DOCUMENTS

| | | | |
|---|---|---|---|
| CN | 102055982 | A | 5/2011 |
| CN | 102292993 | A | 12/2011 |
| CN | 102387368 | A | 3/2012 |
| CN | 102413350 | A | 4/2012 |
| CN | 103297770 | A | 9/2013 |
| CN | 103297771 | A | 9/2013 |
| CN | 105009576 | A | 10/2015 |
| EP | 2389767 | A2 | 11/2011 |
| GB | 2473753 | A | 3/2011 |
| JP | 2009159493 | A | 7/2009 |
| WO | 2012105265 | A1 | 8/2012 |
| WO | 2014138224 | A2 | 9/2014 |
| WO | 2014139566 | A1 | 9/2014 |

OTHER PUBLICATIONS

Ming Li et al., 3D-CE6.h related: Differential coding method for DLT in 3D-HEVC, Joint Collaborative Team on 3D Video Coding Extensions of ITU-T SG 16 WP 3 and ISO/IEC JTC 1/SC 29/WG 11, 4th Meeting: Incheon, KR, Apr. 2013, JCT3V-D0172_r1, pp. 1-8.

Fabian Jager, 3D-CE6.h: Simplified Depth Coding with an optional Depth Lookup Table, Joint Collaborative Team on 3D Video Coding Extensions of ITU-T SG 16 WP 3 and ISO/IEC JTC 1/SC 29/WG 11, 2nd Meeting: Shanghai, CN, Oct. 2013, JCT3V-B0036r3, pp. 1-16.

"3D-HEVC Test Model 3", Jan. 2013, Gerhard Tech, Krzysztof Wegner, Ying Chen and Schoon Yea, Joint Collaborative Team on 3D Video Coding Extension Development of ISO/IEC JTC1/SC29IWG11 and ITU-T SG.16 WP3. 91 pgs.

"3D-CE6.h related: An efficient coding method for DLT in 3DVC",Kai Zhang,int Collaborative Team on 3D Video Coding Extension Development of ITU-T SG 16 WP 3 and ISO/IEC JTC 1/SC 29/WG 11 3rd Meeting: Geneva JCT3V-C0142(Jan. 17, 2013), 5 pgs.

Supplementary European Search Report in European application No. 14782247.2, dated Mar. 2, 2016, 7 pgs.

Zhao X et al:"CE6.h related: On Signaling of DLT for depth coding". 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0182, Apr. 13, 2013 (Apr. 13, 2013), XP030130846, 7 pages, mailed on Apr. 13, 2013.

International Search Report in international application No. PCT/CN2014/074050, dated Jun. 25, 2014, 2 pgs.

English Translation of the Written Opinion of the International Search Authority in international application No. PCT/CN2014/074050, dated Jun. 25, 2014, 6 pgs.

* cited by examiner

METHOD, SYSTEM AND DEVICE FOR CODING AND DECODING DEPTH INFORMATION

TECHNICAL FIELD

The present disclosure relates to the field of compression and coding of three-dimensional videos, and in particular to a method, system and device for coding and decoding depth information.

BACKGROUND

At present, in 3D-HEVC, i.e., an extension framework of High Efficiency Video Coding (HEVC) for coding Three-Dimensional Video (3DV), the Simplified Depth Coding (SDC) and Range Constrained Bit Map (RCBM) based coding and decoding method are usually used to achieve efficient coding and decoding of depth information.

The SDC includes: after coding depth information of each view using a Depth Look-up Table (DLT), an encoder transmits, to a decoder, coded depth information and the corresponding DLT; the decoder decodes the DLT according to preset decoding formats, and decodes coded depth information of the view using the DLT. In addition, the RCBM based coding and decoding method includes: a minimum and maximum in the DLT are coded in a bitstream, and a bit map is used to identify whether depth values of views between the minimum and the maximum are within the DLT. However, the abovementioned two methods for coding and decoding depth information lead to too much overhead in terms of coding information, which thus occupy plenty of transmission resources, affects transmission efficiency and affects coding and decoding efficiency.

SUMMARY

In view of the above, the disclosure is intended to provide a method, system and device for coding and decoding depth information that eliminates redundancy of coding information and improves coding and decoding efficiency.

The disclosure provides a method for coding and decoding depth information, and the method includes:

data in original Depth Look-up Tables (DLTs) of selected views are combined to establish a unified DLT, a value of the number of elements in the unified DLT and each element in the unified DLT are coded respectively and a coded value and each coded element are transmitted to a decoder; and depth information of each view is coded by taking the unified DLT as a whole or in portions and coded depth information of each view is transmitted to the decoder.

In the above solution, the method may further include: elements in the unified DLT are sequenced in a preset order.

In the above solution, the step that data in original DLTs of selected views are combined to establish a unified DLT may include: after the original DLTs of the selected views are formed as arrays, a set union operation is performed on data in DLTs of the selected views which have already been formed as the arrays to establish the unified DLT.

In the above solution, the method may further include: after elements in the unified DLT are sequenced in a preset order, a DLT type is set for each of the views having a DLT and the DLT type of each view is coded.

In the above solution, the DLT type is setting information indicating that the unified DLT and/or an additional DLT is used to code depth information of a view.

In the above solution, the method may further include: after data in original DLTs of selected views are combined to establish a unified DLT, an additional DLT of each view is established according to preset coding formats using the unified DLT and an original DLT of each view and each additional DLT is transmitted to the decoder.

In the above solution, the method may further include: after an additional DLT of each view is established according to preset coding formats using the unified DLT and an original DLT of each view and each additional DLT is transmitted to the decoder, depth information of each view is coded using the DLT type of each view, the unified DLT and the additional DLT of each view and coded depth information of each view are transmitted to the decoder.

In the above solution, the step that an additional DLT of each view is established according to a preset coding format using the unified DLT and an original DLT of each view may include:

each view is extracted in sequence, and when the DLT type of a view is the setting information indicating that an additional DLT is used to code the depth information of the view, a difference in numbers of elements between an original DLT of the view and the unified DLT is coded to establish the additional DLT of the view;

and/or, non-repeated elements between the original DLT and the unified DLT are coded to establish the additional DLT of the view;

and/or, locations in the unified DLT corresponding to a maximum and a minimum in the original DLT of the view and a difference in the locations are coded to establish the additional DLT of the view;

and/or, the minimum in the original DLT of the view and a difference between the minimum and the maximum in the original DLT of the view are coded to establish the additional DLT of the view.

In the above solution, the step that depth information of each view is coded using the DLT type of each view, the unified DLT and the additional DLT of each view and coded depth information of each view is transmitted to the decoder may include: each view is extracted in sequence, and when the DLT type of a view is the setting information indicating that the unified DLT and an additional DLT are used to code depth information of the view, the depth information of the view is coded using the unified DLT and the additional DLT of the view and the coded depth information of each view is transmitted to the decoder.

In the above solution, the step that the depth information of the view is coded using the unified DLT and the additional DLT of the view and the coded depth information of each view is transmitted to the decoder may include: the unified DLT and the additional DLT of the view are combined into a new DLT, the depth information of the view is coded using the new DLT and the coded depth information of each view is transmitted to the decoder.

In the above solution, the unified DLT, the additional DLT of and the original DLT of the view may be coded and transmitted in a bitstream structure including parameter set, slice header or slice segment header.

The disclosure further provides a method for coding and decoding depth information, and the method includes:

a unified DLT is parsed, and a value of the number of elements in the unified DLT and each element in the unified DLT are acquired and saved; and coded depth information of each view is parsed using the unified DLT according to preset decoding formats.

In the above solution, the step that coded depth information of each view is parsed using the unified DLT according to preset decoding formats may include: a DLT type of each view is parsed, and if it is a view that needs a DLT, the coded depth information of each view is decoded using the unified DLT.

In the above solution, the step that the coded depth information of each view is decoded using the unified DLT may include: a DLT of the view is established using the unified DLT and an additional DLT of the view and the coded depth information of the view is decoded using the DLT of the view.

The disclosure provides a method for coding and decoding depth information, and the method includes:

a coder combines data in original DLTs of selected views to establish a unified DLT, codes a value of the number of elements in the unified DLT and each element in the unified DLT respectively and transmits a coded value and each coded element to a decoder; the coder codes depth information of each view by taking the unified DLT as a whole or in portions and transmits coded depth information of each view to the decoder;

the decoder parses the unified DLT transmitted from the coder, and acquires and saves the value of the number of elements in the unified DLT and each element in the unified DLT; and the decoder parses the coded depth information of each view transmitted from the coder using the unified DLT according to preset decoding formats.

The disclosure provides a method for coding depth information, and the method includes:

values of elements in a first DLT are coded;

flag information corresponding to a specified view is coded, which indicates whether the first DLT is used as prediction reference to code a second DLT; and when it is determined according to the flag information that the first DLT is used as the prediction reference to code the second DLT, values of elements in the second DLT are coded using the first DLT as the prediction reference.

In the above solution, the method may include:

depth information of the specified view is coded using the first DLT and/or the second DLT.

In the above solution, the values of the elements in the second DLT are coded using the first DLT as the prediction reference may further include: an additional DLT is constructed using the first DLT and the second DLT.

In the above solution, the step that an additional DLT is constructed may include: an element existing in the second DLT but not included in the first DLT is determined as an element in the additional DLT.

In the above solution, the step that values of elements in a first DLT are coded may include a value of the number of elements in the first DLT is acquired and written into the bitstream.

wherein the values of the elements in the second DLT are coded using the first DLT as the prediction reference, the method may further include: coding bits of the additional DLT are written into the bitstream of parameter set.

In the above solution, the method may further include: when it is determined according to the flag information that the first DLT is not used as the prediction reference to code the second DLT, the values of the elements in the second DLT are coded directly without referencing other DLT(s) and coding bits of the second DLT are written into the bitstream of parameter set.

In the above solution, before the values of the elements in the first DLT are coded, the method may further include: the number of elements included in the first DLT is coded.

In the above solution, before the values of the elements in the additional DLT are coded, the method may further include: the number of elements included in the additional DLT is coded.

In the above solution, before the values of the elements in the second DLT are coded, the method may further include: the number of elements included in the second DLT is coded.

In the above solution, the method may further include: values of elements in a DLT of each view are determined.

The disclosure provides a method for decoding depth information, and the method includes:

values of elements in a first DLT are decoded;

flag information is decoded, and it is determined according to the flag information whether the first DLT is used as prediction reference to decode a second DLT; and when it is determined according to the flag information that the first DLT is used as the prediction reference to decode the second DLT, values of elements in an additional DLT are decoded, and elements in the additional DLT and elements in the first DLT are combined to establish the second DLT.

In the above solution, the method may further include: depth information of a specified view is decoded using the first DLT and/or the second DLT.

In the above solution, the element of the additional DLT is an element existing in the second DLT but not included in the first DLT.

In the above solution, the step that values of elements in an additional DLT are decoded may include: bitstream of parameter set is decoded to obtain the values of the elements in the additional DLT.

In the above solution, the step that values of elements in an additional DLT are decoded may further include: when it is determined according to the flag information that the first DLT is not used as the prediction reference to decode the second DLT, the bitstream of parameter set is decoded to obtain values of elements in the second DLT.

In the above solution, before the values of the elements in the first DLT are decoded, the method may further include: the number of elements included in the first DLT is decoded.

In the above solution, before the values of the elements in the additional DLT are decoded, the method may further include: the number of elements included in the additional DLT is decoded.

In the above solution, before the bitstream of parameter set is decoded to obtain values of elements in the second DLT, the method may further include: information of the number of elements included in the second DLT is determined.

In the above solution: before the bitstream of parameter set is decoded to obtain values of elements in the second DLT, the method may further include: a sum of the number of elements included in the additional DLT and the number of elements included in the first DLT is set as a value of the number of elements included in the second DLT.

The disclosure provides a coder including a second processing unit and a first coding unit, wherein the second processing unit is configured to combine data in original DLTs of selected views to establish a unified DLT, transmit the unified DLT to the first coding unit, code a value of the number of elements in the unified DLT and each element in the unified DLT respectively and transmit a coded value and each coded element to a decoder; and wherein the first coding unit is configured to code depth information of each view using the unified DLT transmitted from the second processing unit by taking the unified DLT as a whole or in portions and transmit coded depth information of each view to the decoder.

In the above solution, the second processing unit is further configured to sequence elements in the unified DLT in a preset order.

In the above solution, the coder may further include a first processing unit configured to form original DLTs of the selected views as arrays and transmit the arrays to the second processing unit;

wherein the second processing unit is configured to perform a set union operation on data in DLTs of the selected views which have already been formed as the arrays transmitted from the first processing unit to establish the unified DLT.

In the above solution, the first coding unit may be configured to set a DLT type for each of the views having a DLT and code the DLT type of each view.

In the above solution, the first coding unit may be configured to take as, the DLT type, setting information indicating that the unified DLT and/or an additional DLT are used to code depth information of a view.

In the above solution, the first coding unit may be further configured to establish an additional DLT of each view according to preset coding formats using the unified DLT and an original DLT of each view and transmit each additional DLT to the decoder.

In the above solution, the first coding unit may be specifically configured to code depth information of each view using the DLT type of each view, the unified DLT and the additional DLT of each view and transmit coded depth information of each view to the decoder.

In the above solution, the first coding unit may be configured to extract in sequence each view, and when the DLT type of a view is the setting information indicating that an additional DLT is used to code the depth information of the view, code a difference in numbers of elements between an original DLT of the view and the unified DLT to establish the additional DLT of the view;

and/or, code non-repeated elements between the original DLT and the unified DLT to establish the additional DLT of the view;

and/or, code locations in the unified DLT corresponding to a maximum and a minimum in the original DLT of the view and a difference in the locations to establish the additional DLT of the view;

and/or, code the minimum in the original DLT of the view and a difference between the minimum and the maximum in the original DLT of the view to establish the additional DLT of the view.

In the above solution, the first coding unit may be configured to extract in sequence each view, and when the DLT type of a view is the setting information indicating that the unified DLT and an additional DLT are used to code depth information of the view, code the depth information of the view using the unified DLT and the additional DLT of the view and transmit coded depth information of each view to the decoder.

In the above solution, the first coding unit may be configured to combine the unified DLT and the additional DLT of the view into a new DLT, code the depth information of the view using the new DLT and transmit coded depth information of each view to the decoder.

In the above solution, the first coding unit may be configured to code and transmit the unified DLT, the additional DLT of and the original DLT of the view in a bitstream structure including parameter set, slice header or slice segment header.

The disclosure further provides a decoder including a first decoding unit and a first processing unit, wherein the first decoding unit is configured to parse a unified DLT, acquire a value of the number of elements in the unified DLT and each element in the unified DLT and transmit an acquired value and each acquired element to the first processing unit; and wherein the first processing unit is configured to parse coded depth information of each view using the unified DLT transmitted from the first decoding unit according to preset decoding formats.

In the above solution, the first processing unit may be configured to parse a DLT type of each view, and if it is a view that needs a DLT, decode the coded depth information of each view using the unified DLT.

In the above solution, the first processing unit may be configured to establish a DLT of the view using the unified DLT and an additional DLT of the view and decode the coded depth information of the view using the DLT of the view.

The disclosure further provides a system for coding and decoding depth information, and the system includes a coder and a decoder, wherein the coder is configured to: combine data in original DLTs of selected views to establish a unified DLT; code a value of the number of elements in the unified DLT and each element in the unified DLT respectively and transmit a coded value and each coded element to a decoder; and code depth information of each view by taking the unified DLT as a whole or in portions and transmit coded depth information of each view to the decoder; and wherein the decoder is configured to: parse the unified DLT transmitted from the coder, acquire and save the value of the number of elements in the unified DLT and each element in the unified DLT; and parse the coded depth information of each view transmitted from the coder using the unified DLT according to preset decoding formats.

The disclosure provides a coder including:

a first coding unit configured to code values of elements in a first Depth Look-up Table (DLT);

a second coding unit configured to code flag information corresponding to a specified view and indicate by the flag information whether the first DLT is used as prediction reference to code a second DLT; and a third coding unit configured to, when it is determined according to the flag information that the first DLT is used as the prediction reference to code the second DLT, code values of elements in the second DLT using the first DLT as the prediction reference.

In the above solution, the coder may further include a first processing unit configured to construct an additional DLT using the first DLT and the second DLT.

In the above solution, the first processing unit may be specifically configured to determine, as an element in the additional DLT, an element existing in the second DLT but not included in the first DLT.

In the above solution, the first processing unit may be further configured to, before coding the values of the elements in the first DLT, code the number of elements included in the first DLT; and the third processing unit may be further configured to, before coding values of elements in the additional DLT, code the number of elements included in the additional DLT.

In the above solution, the third processing unit may be further configured to, when it is determined according to the flag information that the first DLT is not used as the prediction reference to code the second DLT, code directly the values of the elements in the second DLT without referencing other DLT(s) and writing a coding bit of the second DLT into the parameter set bitstream.

In the above solution, the coder may further include a fourth coding unit configured to code depth information of a specified view using the first DLT and/or the second DLT.

The disclosure provides a decoder including:

a first decoding unit configured to decode values of elements in a first Depth Look-up Table (DLT);

a second decoding unit configured to decode flag information and determine according to the flag information whether the first DLT is used as prediction reference to decode a second DLT; and a third decoding unit configured to, when it is determined according to the flag information that the first DLT is used as the prediction reference to decode the second DLT, decode values of elements in an additional DLT, and combine elements in the additional DLT and elements in the first DLT and determine combined elements as elements of the second DLT.

In the above solution, the first decoding unit may be further configured to, before decoding the values of the elements in the first DLT, decode information of the number of elements included in the first DLT.

In the above solution, the third decoding unit may be further configured to, before decoding the values of the elements in the additional DLT, decode the number of elements included in the additional DLT.

In the above solution, the third decoding unit may be further configured to, before decoding values of elements in the second DLT, decode the number of elements included in the second DLT.

In the above solution, the decoder may further include: a first processing unit configured to set, as a value of the number of elements included in the second DLT, a sum of the number of elements included in the additional DLT and the number of elements included in the first DLT.

In the above solution, the decoder may further include: a fourth decoding unit configured to decode depth information of a specified view using the first DLT and/or the second DLT.

The disclosure further provides a system for coding and decoding depth information, and the system includes:

the coder as described above; and the decoder as described above.

By means of the method, system and device for coding and decoding depth information according to the embodiments of the disclosure, it is possible to combine data in original DLTs of selected views to establish a unified DLT, and transmit the unified DLT to a decoder; and possible to code depth information of each view using the unified DLT and transmit coded depth information to a decoder. In this way, when depth information of respective views are transmitted, it is possible to avoid re-transmission of information shared by all views, repeated contents in DLTs of all views are encapsulated into the unified DLT and then transmitted only once to the decoder, thus the redundancy of coding information is reduced and then coding and decoding efficiency is improved.

DETAILED DESCRIPTION

The basic idea of the embodiments of the disclosure is: data in original DLTs of selected views are combined to establish a unified DLT, a value of the number of elements in the unified DLT and each element in the unified DLT are coded respectively and a coded value and each coded element are transmitted to a decoder; and depth information of each view is coded by taking the unified DLT as a whole or in portions and coded depth information of each view is transmitted to the decoder.

The disclosure will be further elaborated below in combination with accompanying drawings and specific embodiments.

Figure 1:
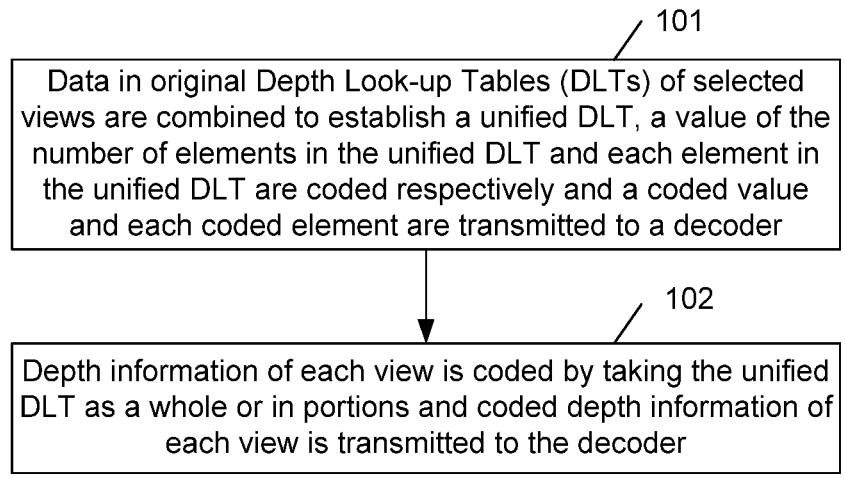
FIG. 1 is a flow chart showing a coding process in a method for coding and decoding depth information according to an embodiment of the disclosure.

A coding process in a method for coding and decoding depth information according to an embodiment of the disclosure is as shown in FIG. 1, which includes the following steps:

step 101, data in original Depth Look-up Tables (DLTs) of selected views are combined to establish a unified DLT, a value of the number of elements in the unified DLT and each element in the unified DLT are coded respectively and a coded value and each coded element are transmitted to a decoder.

Herein the selected views are a desired number of views selected as required, for example, they can be all views in a current video or all views in a specified region.

The combination of data in original DLTs of selected views may include: after the original DLTs of the selected views are formed as arrays, data in DLTs of the selected views which have already been formed as the arrays are combined to establish the unified DLT.

The original DLTs contain information of views required by a coder, which is specified in the prior arts, and its acquisition method is well known and thus will be omitted herein.

In the original DLTs and the unified DLT, index numbers are used to represent depth values; the unified DLT has a data structure that elements therein are sequenced in preset orders, for example, in ascending order or in descending order.

The transmission of the unified DLT to the decoder may include: the number of elements in the unified DLT and values of the elements coded according to u(v) or ue(v) are transmitted to the decoder through a specified bitstream format.

Specifically, the specified bitstream format is applicable to bitstream structures such as parameter set, slice header or slice segment header, for example:

```
If(unified_dlt_valid_flag){
num_depth_values_in_unified_dlt                              ue(v)
for ( j = 0; j < num_depth_values_in_unified_dlt ; j++) {
unified_dlt_depth_value [ j ]                                ue(v)
}
}
``` where unified_dlt_valid_flag is a flag indicating a unified DLT is used.

num_depth_values_in_unified_dlt is the number of depth sample values included in the unified DLT, and num_depth_values_in_unified_dlt can be coded and decoded using a coding and decoding method corresponding to ue(v) or to u(v). When the coding and decoding method corresponding to u(v) is used, the number of bits for num_depth_values_in_unified_dlt in the bitstream is equal to a bit depth of depth component;

unified_dlt_depth_value [j] is a value of each element in the unified DLT, and unified_dlt_depth_value [j] can be coded and decoded using a coding and decoding method corresponding to ue(v) or u(v). When the coding and decoding method corresponding to u(v) is used, the number of bits for unified_dlt_depth_value [j] in the bitstream is equal to a bit depth of depth component. u(v) and ue(v) are both coding methods specified in the prior arts, thus detailed description thereof will be omitted herein.

Step 102, depth information of each view is coded by taking the unified DLT as a whole or in portions and coded depth information of each view is transmitted to the decoder.

step can further be: the DLT type of each view is set, an additional DLT of each view is established using the unified DLT and the original DLT of each view according to preset coding formats; the depth information of each view is coded using the DLT type of each view, the unified DLT and the additional DLT of each view, and coded depth information is transmitted to the decoder.

Herein, each view is selected from all views of the current video, the DLT type is setting information indicating that the unified DLT and/or an additional DLT is used to code depth information of a view.

Further, whether DLT coding is performed on a view can be set according to the following format:

```
......
if ( DepthFlag ) {
  dlt_flag
}
......
``` where DepthFlag is a flag indicating whether current processing component is depth component. When value of dlt_flag is equal to 1, it indicates that decoder needs to use a DLT during decoding the corresponding view; in contrary, if the value of dlt_flag is equal to 0, it indicates that decoder doesn't need to use a DLT during decoding the view. The coding and decoding methods for this element are the coding and decoding method corresponding to u(1), respectively.

The setting of the DLT type of each view may include: an original DLT flag (dlt_flag) of each view is set to a specified value for indicating whether a DLT is used to code and decode a view, for example, dlt_flag can be set to 1 to indicate that the view is coded and decoded using a DLT.

The sub-step that an additional DLT of each view is established according to preset coding formats using the unified DLT and an original DLT of each view may include:

each view is extracted in sequence, and when the DLT type of a view is the setting information indicating that an additional DLT is used to code the depth information of the view, a difference in numbers of elements between an original DLT of the view and the unified DLT is coded using ue(v) or u(v) to establish the additional DLT of the view;

and/or, non-repeated elements between the original DLT and the unified DLT are coded using ue(v) or u(v) to establish the additional DLT of the view;

and/or, locations in the unified DLT corresponding to a maximum and a minimum in the original DLT of the view and a difference in the locations are coded using ue(v) or u(v) to establish the additional DLT of the view;

and/or, the minimum in the original DLT of the view and a difference between the minimum and the maximum in the original DLT of the view are coded using ue(v) or u(v) to establish the additional DLT of the view.

The transmission of the additional DLT of each view to the decoder is applicable to a DLT information bitstream coded and transmitted in a bitstream structure including parameter set, slice header or slice segment header, and the transmission includes: the number of elements in the additional DLT and a value of each element in the additional DLT are transmitted to the decoder according to a specified bitstream format;

the specified bitstream format may include: a bit field indicating whether an additional DLT is used at a view, a bit field indicating information of the number of elements in an additional DLT, and a bit field indicating a value of each element in an additional DLT, for example

|  | Descriptor |
|---|---|
| ...... | |
| if ( DepthFlag ) { | |
| dlt_flag | u(1) |
| If(dlt_flag){ | |
| num_depth_values_in_add_dlt | ue(v) |
| for ( j = 0; j < num_depth_values_in_add_dlt ; j++) { | |
| add_dlt_depth_value [ j ] | ue(v) |
| } | |
| } | |
| } | |
| ...... | | where DepthFlag is a flag indicating whether current processing component is depth component;

when a value of dlt_flag is equal to 1, it indicates that a decoder needs to use a DLT during coding a corresponding view; in contrary, if the value of dlt_flag is equal to 0, it indicates that decoder doesn't need to use a DLT during coding the view. The coding and decoding method for this element is the coding and decoding method corresponding to u(1), respectively;

num_depth_values_in_add_dlt indicates the number of depth sample values included in the additional DLT. num_depth_values_in_add_dlt can be coded and decoded using coding and decoding methods corresponding to ue(v) or to u(v). When the coding and decoding methods corresponding to u(v) are used, the number of bits corresponding to num_depth_values_in_add_dlt in the bitstream is equal to a bit depth of depth component;

add_dlt_depth value [j] is a value of each element in the additional DLT, and add_dlt_depth value [j] can be coded and decoded using a coding and decoding method corresponding to ue(v) or to u(v). When the coding and decoding method corresponding to u(v) is used, the number of bits corresponding to add_dlt_depth_value [j] in the bitstream is equal to a bit depth of depth component.

The specified bitstream format may further include: a bit field indicating whether a DLT is used for coding a view, a bit field indicating information of the number of elements in an additional DLT, and a bit field indicating a value of each element in an additional DLT, for example

|  | Descriptor |
|---|---|
| if ( DepthFlag ) { | |
| dlt_flag | u(1) |
| If(dlt_flag){ | |
| dlt_info | u(1) |
| If(dlt_info){ | |
| dlt_view_min_value | ue(v) |
| dlt_view_diff_value | ue(v) |
| } | |
| } | |
| } | | when a value of dlt_flag is equal to 1, it indicates that a decoder needs to use a DLT during coding corresponding view; in contrary, if the value of dlt_flag is equal to 0, it indicates that decoder doesn't need to use a DLT during coding the view. The coding and decoding methods for this element are the coding and decoding methods corresponding to u(1);

when a value of dlt_info is equal to 1, it indicates that a maximum and a minimum in an original DLT of a view are different from a maximum and minimum in the unified DLT; in contrary, when the value is equal to 0, it indicates that the maximum and the minimum in the original DLT of the view are the same as the maximum and the minimum in the unified DLT. The coding and decoding methods for this element are the coding and decoding methods corresponding to u(1);

dlt_view_min_value indicates the location in the unified DLT corresponding to a minimum depth value in the original DLT of the view. The coding and decoding methods for this element are the coding and decoding methods corresponding to ue(v);

dlt_view_diff_value indicates a difference in locations in the unified DLT corresponding to a minimum depth value and a maximum depth value in the original DLT of the view. The coding and decoding methods for this element are the coding and decoding methods corresponding to ue(v).

The step that depth information of each view is coded using the DLT type of each view, the unified DLT and the additional DLT of each view and coded depth information of each view is transmitted to the decoder may include: each view is extracted in sequence, and when the DLT type of a view is the setting information indicating that a DLT is used to code depth information of the view, the depth information of the view is coded using the unified DLT and the additional DLT of the view and the coded depth information of each view is transmitted to the decoder.

The step that the depth information of the view is coded using the unified DLT and the additional DLT of the view and the coded depth information of each view is transmitted to the decoder may include: the unified DLT and the additional DLT of the view are combined into a new DLT, the depth information of the view is coded using the new DLT and the coded depth information of each view is transmitted to the decoder.

The specified bitstream format may further include: information identifying whether an original DLT of a view is recovered constructed using the unified DLT and an additional DLT of the view, information identifying the number of elements in the original DLT of the view, and information identifying a value of each element in the original DLT of the view. Information identifying whether a DLT of the view is used, information identifying the number of elements in an additional DLT, and information identifying a value of each element in the additional DLT. In the corresponding bitstream, below bit fields as follow are carried: a bit field indicating whether an independent DLT is used, a bit field indicating information of the number of elements in the DLT, and a bit field indicating a value of each element in the DLT, a bit field indicating whether DLT is used for a view, a bit field indicating information of the number of elements in an additional DLT, and a bit field indicating value of each element in an additional DLT, for example

|  | Descriptor |
|---|---|
| ...... | |
| if ( DepthFlag ) { | |
| dlt_flag | u(1) |
| If(dlt_flag){ | |
| independent_dlt_flag | u(1) |
| If(independent_dlt_flag){ | |
| num_depth_values | ue(v) |
| for ( j = 0; j < num_depth_values ; j++) { | |
| dlt_depth_value [ j ] | ue(v) |
| } | |
| } | |
| Else{ | |
| num_depth_values_in_add _dlt | ue(v) |
| for   (   j   =   0;   j   < num_depth_values_in_add_dlt ; j++) { | |
| add _dlt_depth_value [ j ] | ue(v) |
| } | |
| } | |
| } | |
| } | |
| ...... | | where DepthFlag is a flag for indicating whether current processing component is depth component;

when a value of dlt_flag is equal to 1, it indicates that a decoder needs to use a DLT during coding corresponding view; in contrary, if the value of dlt_flag is equal to 0, it indicates that decoder doesn't need to use a DLT during coding the view. The coding and decoding methods for this element are the coding and decoding methods corresponding to u(1);

when a value of independent_dlt_flag is equal to 1, it indicates that the decoder needs to construct an DLT of a view using an independent DLT of the view rather than the unified DLT and the additional DLT during decoding the view; in contrary, when the value is equal to 0, it indicates that the decoder needs to construct the DLT of the view using the unified DLT and the additional DLT during decoding the view. The coding and decoding methods for this element are the coding and decoding methods corresponding to u(1);

num_depth_values indicates the number of values of depth sample valuesing points included in the original DLT of the view. num_depth_values can be coded and decoded using a coding and decoding methods corresponding to ue(v) or to u(v). When the coding and decoding methods corresponding to u(v) are used, the number of bits corresponding to add_dlt_depth_value in the bitstream is equal to bit depth of depth component.

dlt_depth_value [j] is a value of each element in the original DLT of the view, and dlt_depth_value [j] can be coded and decoded using coding and decoding methods corresponding to ue(v) or to u(v). When the coding and decoding methods corresponding to u(v) is are used, the number of bits corresponding to add_dlt_depth_value [j] in the bitstream is equal to bit depth of depth component.

num_depth_values_in_add_dlt indicates the number of depth sample values included in the additional DLT. num_depth_values_in_add_dlt can be coded and decoded using a coding and decoding methods corresponding to ue(v) or to u(v). When the coding and decoding methods corresponding to u(v) are is used, the number of bits corresponding to num_depth_values_in_add_dlt in the bitstream is equal to a bit depth of depth component;

add_dlt_depth value [j] is value of each element in the additional DLT, and add_dlt_depth value [j] can be coded and decoded using coding and decoding methods corresponding to ue(v) or to u(v). When the coding and decoding methods corresponding to u(v) are used, the number of bits corresponding to add_dlt_depth_value [j] in the bitstream is equal to a bit depth of depth component.

The method for coding depth information of the view belongs to prior arts, detailed description of which will be omitted herein.

Figure 2:
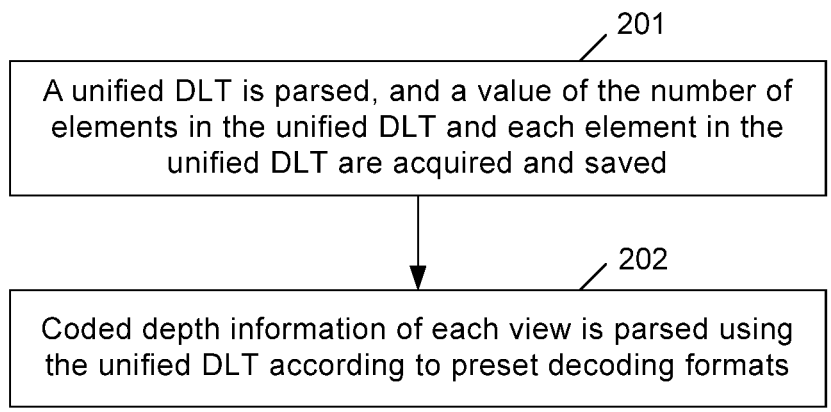
FIG. 2 is a flow chart showing a decoding process in a method for coding and decoding depth information according to an embodiment of the disclosure.

A decoding process in a method for coding and decoding depth information according to an embodiment of the disclosure is as shown in FIG. 2, which includes the following steps:

step 201, a unified DLT is parsed, and a value of the number of elements in the unified DLT and each element in the unified DLT are acquired and saved.

Specifically, a value of an attribute identifier of the unified DLT is checked, if the value is 1, the number of elements in the unified DLT and values of the elements are parsed.

Herein the parsing method belongs to prior arts, detailed description of which will be omitted herein.

Step 202, coded depth information of each view is parsed using the unified DLT according to preset decoding formats.

This step can be: the additional DLT of each view transmitted from the coder is parsed, and each view is parsed using the unified DLT and the additional DLT of each view according to the DLT type of each view in accordance with a preset decoding format.

Herein the decoding is performed by a decoder according to pre-configured method corresponding to the coder, for example, the unified DLT is decoded using methods corresponding to u(v) or ue(v), where u(v) and ue(v) are coding methods specified in prior arts, detailed description of which will be omitted herein.

The parsing may include: a value of an attribute identifier of an additional DLT of each view is checked, if the value is 1, the number of elements in the additional DLT of the view and values of the elements are extracted.

The step that the additional DLT of each view transmitted from the coder is parsed, and each view is parsed using the unified DLT and the additional DLT of each view according to the DLT type of each view in accordance with preset decoding formats may be: the DLT type of each view is parsed, and if it is a view that needs a DLT, an DLT of the view is established using the unified DLT and the additional DLT of the view and the depth information of the view is decoded using the DLT of the view. The decoding belongs to prior arts, detailed description of which will be omitted herein.

Figure 3:
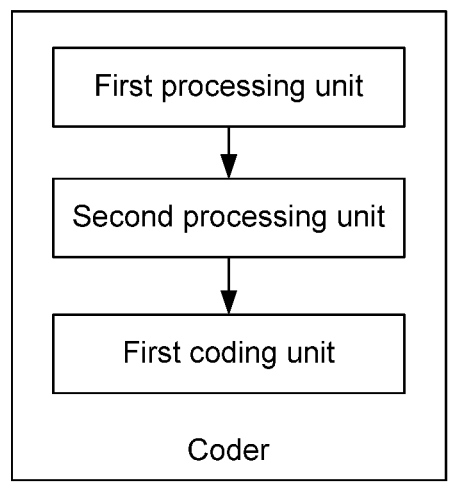
FIG. 3 is a schematic structural diagram of a coder according to an embodiment of the disclosure.

An embodiment of the disclosure provides a coder, as shown in FIG. 3, and the coder includes a second processing unit and a first coding unit, wherein the second processing unit is configured to combine data in original Depth Look-up Tables (DLTs) of selected views to establish a unified DLT, transmit the unified DLT to the first coding unit, code a value of the number of elements in the unified DLT and each element in the unified DLT respectively and transmit coded value of each coded element to a decoder; and wherein the first coding unit is configured to code depth information of each view using the unified DLT transmitted from the second processing unit and transmit coded depth information of each view to the decoder.

The coder further includes a first processing unit configured to form DLTs of the selected views as arrays and transmit the arrays to the second processing unit; accordingly, the second processing unit is specifically configured to combine data in DLTs of the selected views which have already been formed as the arrays transmitted from the first processing unit to establish the unified DLT.

The first processing unit is specifically configured to extract a desired number of views selected as required, for example, they can be all views in a current video or all views in a specified region.

The second processing unit is specifically configured to perform a set intersection or set union operation on DLTs corresponding to the selected views to establish the unified DLT.

The first coding unit is specifically configured to code the unified DLT using u(v) or ue(v), wherein u(v) and ue(v) are coding methods specified in prior arts, detailed description of which will be omitted herein.

The first coding unit is configured to set an DLT flag of each view to a specified value for indicating whether DLT is used to code and decode a view, for example, dlt_flag can be set to 1 for indicating that the view is coded and decoded using a DLT.

The first coding unit is specifically configured to extract in sequence each view, and when the DLT type of a view is the setting information that an additional DLT is used to code the depth information of the view, code a difference in numbers of elements between an original DLT of the view and the unified DLT using ue(v) and u(v) to establish the additional DLT of the view;

and/or, take non-repeated elements between the original DLT and the unified DLT as the additional DLT of the view and code the additional DLT of the view using ue(v) or u(v) to establish the additional DLT of the view;

and/or, code locations in the unified DLT corresponding to a maximum and a minimum in the original DLT of the view and a difference in the locations using ue(v) or u(v) to establish the additional DLT of the view;

and/or, code the minimum in the original DLT of the view and a difference between the minimum and the maximum in the original DLT of the view using ue(v) or u(v) to establish the additional DLT of the view.

the first coding unit is configured to extract in sequence each view, and when the DLT type of a view is the setting information indicating that the unified DLT and an additional DLT are used to code depth information of the view, code the depth information of the view using the unified DLT and the additional DLT of the view and transmit coded depth information of the view to the decoder.

Figure 4:
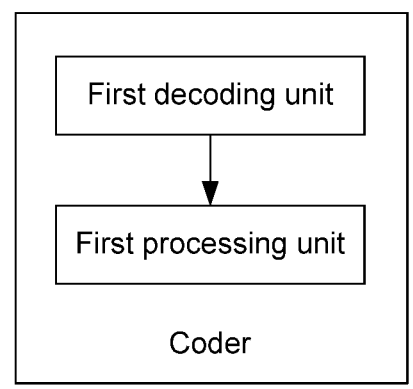
FIG. 4 is a schematic structural diagram of a decoder according to an embodiment of the disclosure.

A decoder according to an embodiment of the disclosure is shown in FIG. 4, which includes a first decoding unit and a first processing unit, wherein the first decoding unit is configured to parse a unified DLT transmitted from a coder, acquire a value of the number of elements in the unified DLT and each element in the unified DLT and transmit an acquired value and each acquired element to the first processing unit; and wherein the first processing unit is configured to parse coded depth information of each view, which is transmitted from the coder, using the unified DLT transmitted from the first decoding unit according to preset decoding formats.

The first decoding unit is configured to perform a decoding operation according to pre-configured method corresponding to the coder, for example, decoding the unified DLT using methods corresponding to u(v) or ue(v), where u(v) and ue(v) are coding methods specified in prior arts, detailed description of which will be omitted herein.

the first processing unit is configured to parse the DLT type of each view, and if it is a view that needs a DLT, establish a DLT of the view using the unified DLT and an additional DLT of the view and decode the coded depth information of the view using the DLT of the view.

Figure 5:
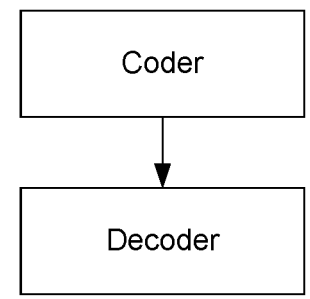
FIG. 5 is a schematic structural diagram of a system for coding and decoding depth information according to an embodiment of the disclosure.

A system for coding and decoding depth information according to an embodiment of the disclosure is shown in FIG. 5, which includes a coder and a decoder, the coder is configured to: combine data in original DLTs of selected views to establish a unified DLT, transmit the unified DLT to the decoder, set the DLT type of each view, and establish an additional DLT of each view using the unified DLT and the original DLT of each view according to preset coding formats; code the depth information of each view using the DLT type of each view, the unified DLT and the additional DLT of each view, transmit coded depth information to the decoder and transmit the additional DLT of each view to the decoder; and the decoder is configured to: parse the unified DLT transmitted from the coder and save a parsed DLT, and parse the additional DLT of each view transmitted from the coder; and parse each view using the unified DLT and the additional DLT of each view according to the DLT type of each view in accordance with preset decoding formats.

Embodiment 1

Figure 6:
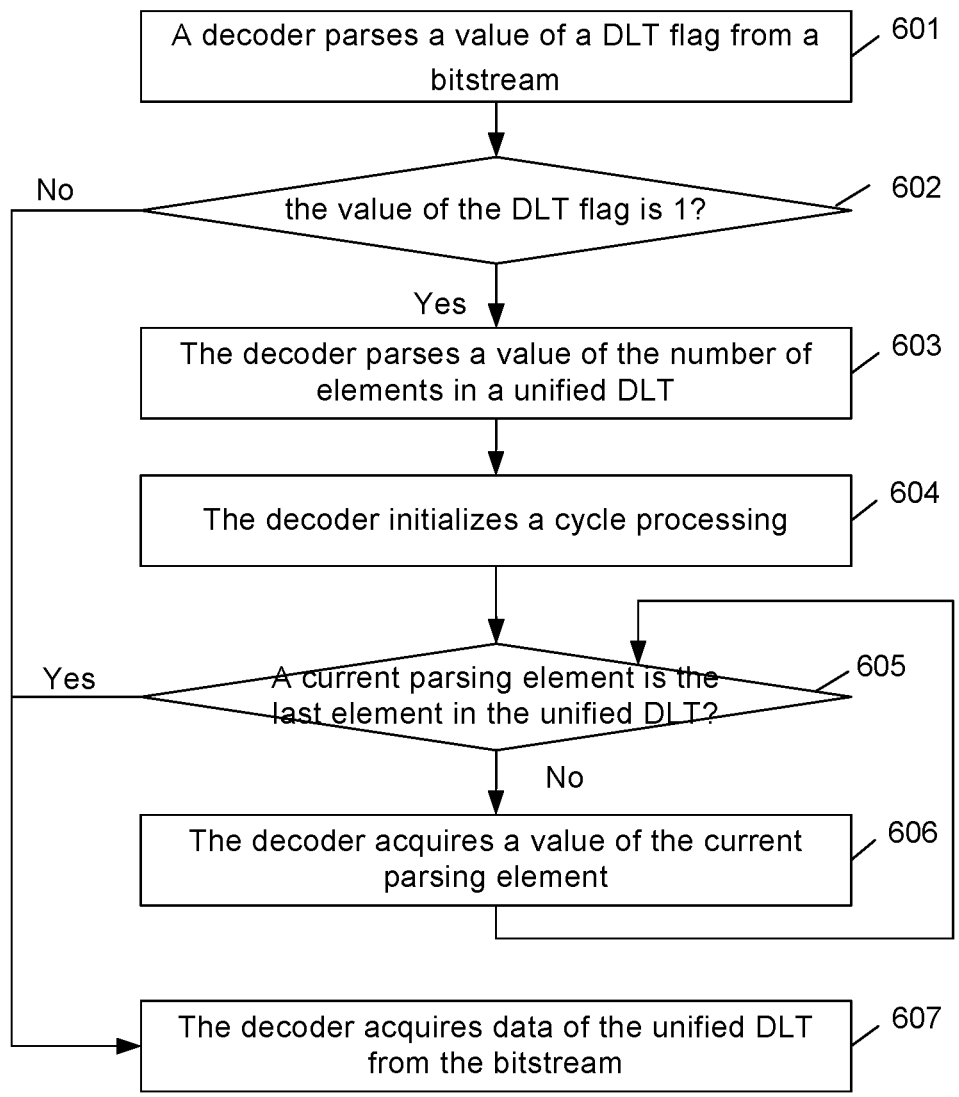
FIG. 6 is a first flow chart of a first embodiment of the disclosure.

The decoding method according to this embodiment is as shown in FIG. 6, and the decoding method includes:

Step 601, a decoder parses a value of DLT flag from a bitstream.

Specifically, the decoder parses a bit field corresponding to dlt_flag from the bitstream using a decoding method corresponding to u(1) to acquire the value of dlt_flag.

Step 602, the decoder determines whether the value of dlt_flag is 1, if yes, proceed to step 603; otherwise, proceed to step 607.

Step 603, the decoder parses a value of the number of elements in a unified DLT.

Specifically, the decoder parses a bit field corresponding to num_depth_values_in_unified_dlt from the bitstream using a decoding method corresponding to ue(v) to acquire the value of num_depth_values_in_unified_dlt;

or, the decoder parses a bit field corresponding to num_depth_values_in_unified_dlt from the bitstream using a decoding method corresponding to u(v) to acquire the value of num_depth_values_in_unified_dlt.

Step 604, the decoder initializes a cycle processing.

j=0.

Step 605, the decoder determines whether a current parsing element is the last element in the unified DLT (j<num_depth_values_in_unified_dlt), if yes, proceed to step 606; otherwise, proceed to step 607.

Step 606, the decoder acquires a value of the current parsing element unified_dlt_depth_value [j], return to step 605.

Specifically, the decoder parses a bit field corresponding to unified_dlt_depth_value [j] from the bitstream using a decoding method corresponding to ue(v) to acquire the value of unified_dlt_depth_value [j];

or, the decoder parses a bit field corresponding to unified_dlt_depth_value [j] from the bitstream using a decoding method corresponding to u(v) to acquire the value of unified_dlt_depth_value [j].

Step 607, the decoder acquires data of the unified DLT from the bitstream.

The unified DLT acquired by parsing the bitstream according to the embodiment is used to decode depth information of all views that need a DLT.

Figure 7:
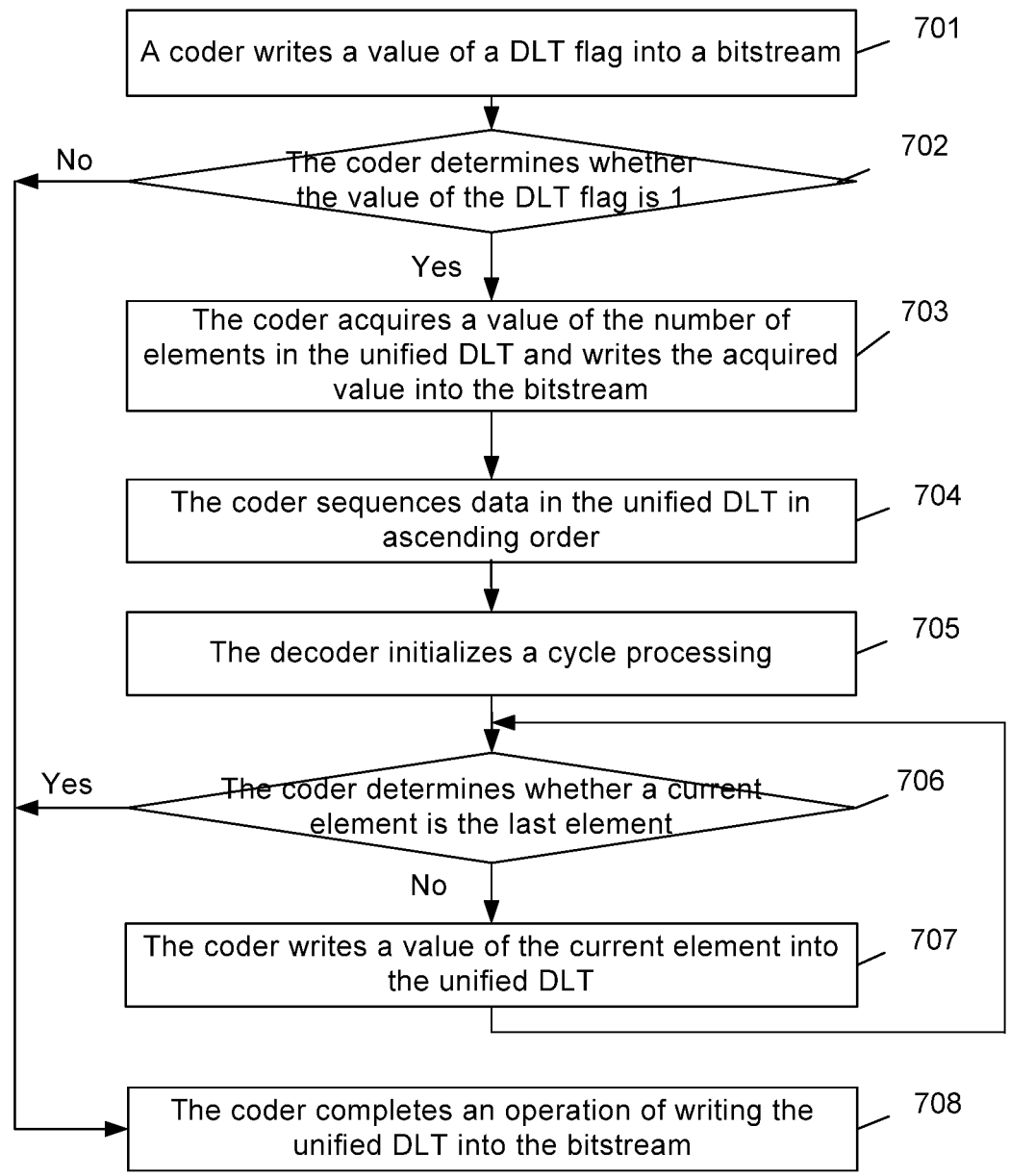
FIG. 7 is a second flow chart of a first embodiment of the disclosure.

A logic flow chart of a coder that uses the bitstream organization method according to the embodiment is as shown in FIG. 7. In the embodiment, an intersection or union of depth values in DLTs of all views is taken as a unified DLT, and each view is coded and decoded using the unified DLT.

Step 701, a coder writes a value of a DLT flag into a bitstream using a code method corresponding to u(1).

The coder determines according to an existing coder optimization technique whether a DLT is required to be used during coding. If a DLT is used, the value of dlt_flag is set to 1; otherwise, the value of dlt_flag is set to 0.

Step 702, the coder determines whether the value of dlt_flag is 1, if yes, proceed to step 703; otherwise, proceed to step 708.

Step 703, the coder uses DLTs of all views to establish a unified DLT, calculates a value of the number of elements in the unified DLT and writes the calculated value into the bitstream.

The coder takes, as the unified DLT, the union of depth values in DLTs of all views, stores the unified DLT into an array, counts the number of valid elements included in the array and takes it as the value of the number of elements in the unified DLT.

Step 704, the coder sequences data in the unified DLT in ascending order.

Step 705, the decoder initializes a cycle processing: j=0.

Step 706, the coder determines whether a current element is the last element (whether j<num_depth_values_in_unified_dlt), if yes, proceed to step 707; otherwise, proceed to step 708.

Step 707, the coder writes a value of the current element into the unified DLT, and updates a counter: j++. Return to step 706.

The coder writes the value of unified_dlt_depth_value [j] into the bitstream using a coding method corresponding to ue(v); or, alternatively, the coder writes the value of unified_dlt_depth_value [j] into the bitstream using a coding method corresponding to u(v).

Step 708, the coder completes an operation of writing the unified DLT into the bitstream.

The unified DLT acquired by the coder according to the embodiment is used to code depth information of all views that need a DLT.

Embodiment 2

Figure 8:
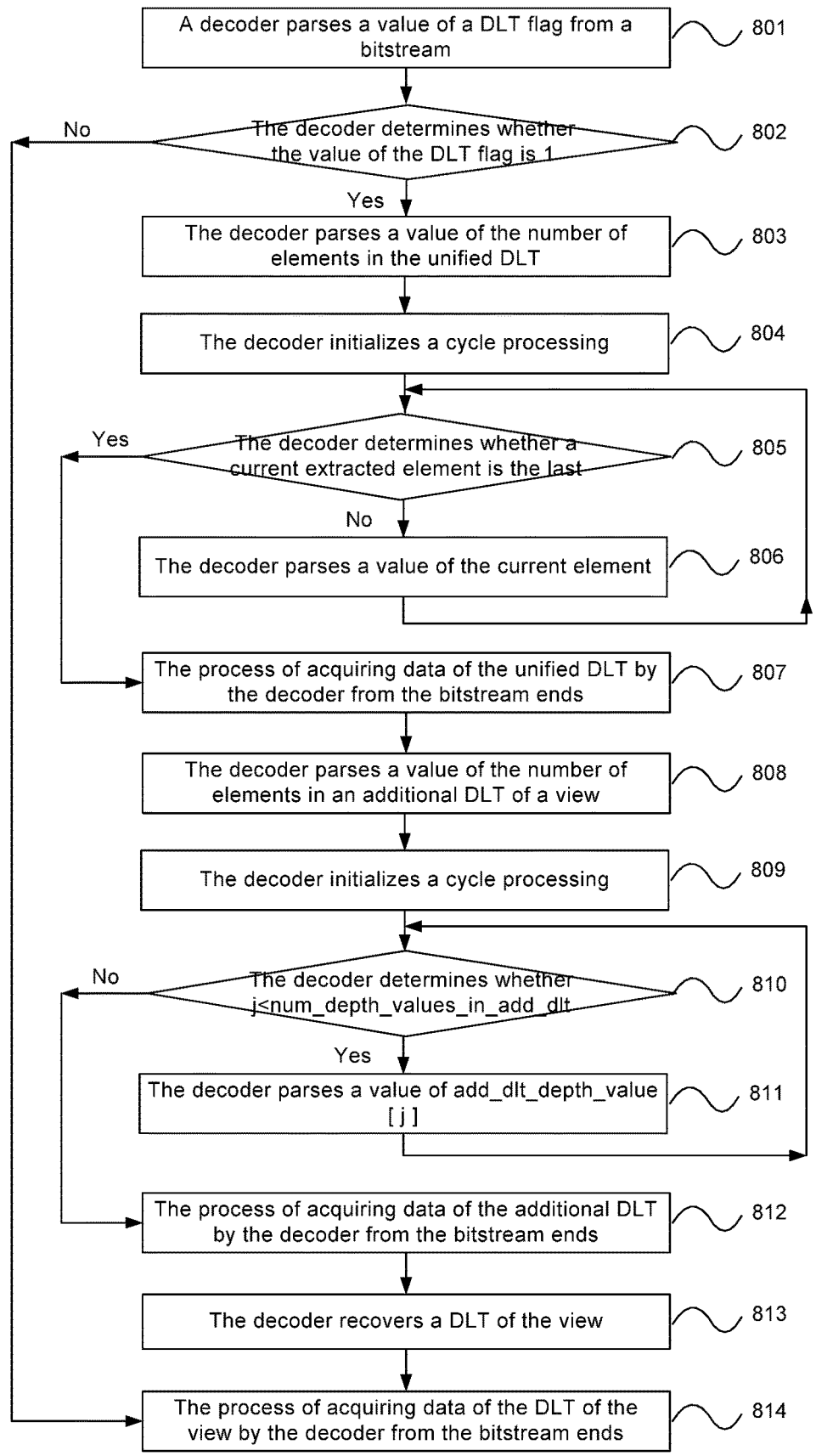
FIG. 8 is a first flow chart of a second embodiment of the disclosure.

A logic flow chart of a decoder (or decoding method) that uses the bitstream organization method according to the embodiment is as shown in FIG. 8.

Step 801, a decoder parses a value of dlt_flag from a bitstream.

The decoder parses a bit field corresponding to dlt_flag from the bitstream using a decoding method corresponding to u(1) to acquire the value of dlt_flag.

Step 802, the decoder determines whether the value of dlt_flag is 1 if yes, proceed to step 803; otherwise, proceed to step 814.

Step 803, the decoder parses a value of num_depth_values_in_unified_dlt.

The decoder parses a bit field corresponding to num_depth_values_in_unified_dlt from the bitstream using a decoding method corresponding to ue(v) to acquire the value of num_depth_values_in_unified_dlt; or alternatively, the decoder parses a bit field corresponding to num_depth_values_in_unified_dlt from the bitstream using a decoding method corresponding to u(v) to acquire the value of num_depth_values_in_unified_dlt.

Step 804, the decoder initializes a cycle processing: j=0.

Step 805, the decoder determines whether j<num_depth_values_in_unified_dlt. If yes, proceed to step 806; otherwise, proceed to step 807.

Step 806, the decoder parses a value of unified_dlt_depth_value [j].

The decoder parses a bit field corresponding to unified_dlt_depth_value [j] from the bitstream using a decoding method corresponding to ue(v) to acquire the value of unified_dlt_depth_value [j]; or the decoder parses a bit field corresponding to unified_dlt_depth value [j] from the bitstream using a decoding method corresponding to u(v) to acquire the value of unified_dlt_depth_value [j].

Step 807, the process of acquiring data of the unified DLT by the decoder from the bitstream ends, the data of the unified DLT is stored in the array unified_dlt_depth_value.

Step 808, the decoder parses a value of num_depth_values_in_add_dlt.

The decoder parses a bit field corresponding to num_depth_values_in_add_dlt from the bitstream using a decoding method corresponding to ue(v) to acquire the value of num_depth_values_in_add_dlt; or alternatively, the decoder parses a bit field corresponding to num_depth_values_in_add_dlt from the bitstream using a decoding method corresponding to u(v) to acquire the value of num_depth_values_in_add_dlt.

Step 809, the decoder initializes a cycle processing: j=0.

Step 810, the decoder determines whether j<num_depth_values_in_add_dlt. If yes, proceed to step 811; otherwise, proceed to step 812.

Step 811, the decoder parses a value of add_dlt_depth_value [j].

The decoder parses a bit field corresponding to add_dlt_depth_value [j] from the bitstream using a decoding method corresponding to ue(v) to acquire the value of add_dlt_depth value [j]; or alternatively, the decoder parses a bit field corresponding to add_dlt_depth_value [j] from the bitstream using a decoding method corresponding to u(v) to acquire the value of add_dlt_depth_value [j].

Step 812, the process of acquiring data of the unified DLT by the decoder from the bitstream ends, the data of the unified DLT is stored in the array add_dlt_depth_value.

Step 813, the decoder recovers a DLT of the view, and the DLT of the view is a union of add_dlt_depth_value and unified_dlt_depth value.

Step 814, the process of acquiring data of the DLT by the decoder from the bitstream ends.

The DLT acquired by the parsing the bitstream according to the embodiment is used to decode depth information of the view.

Figure 9:
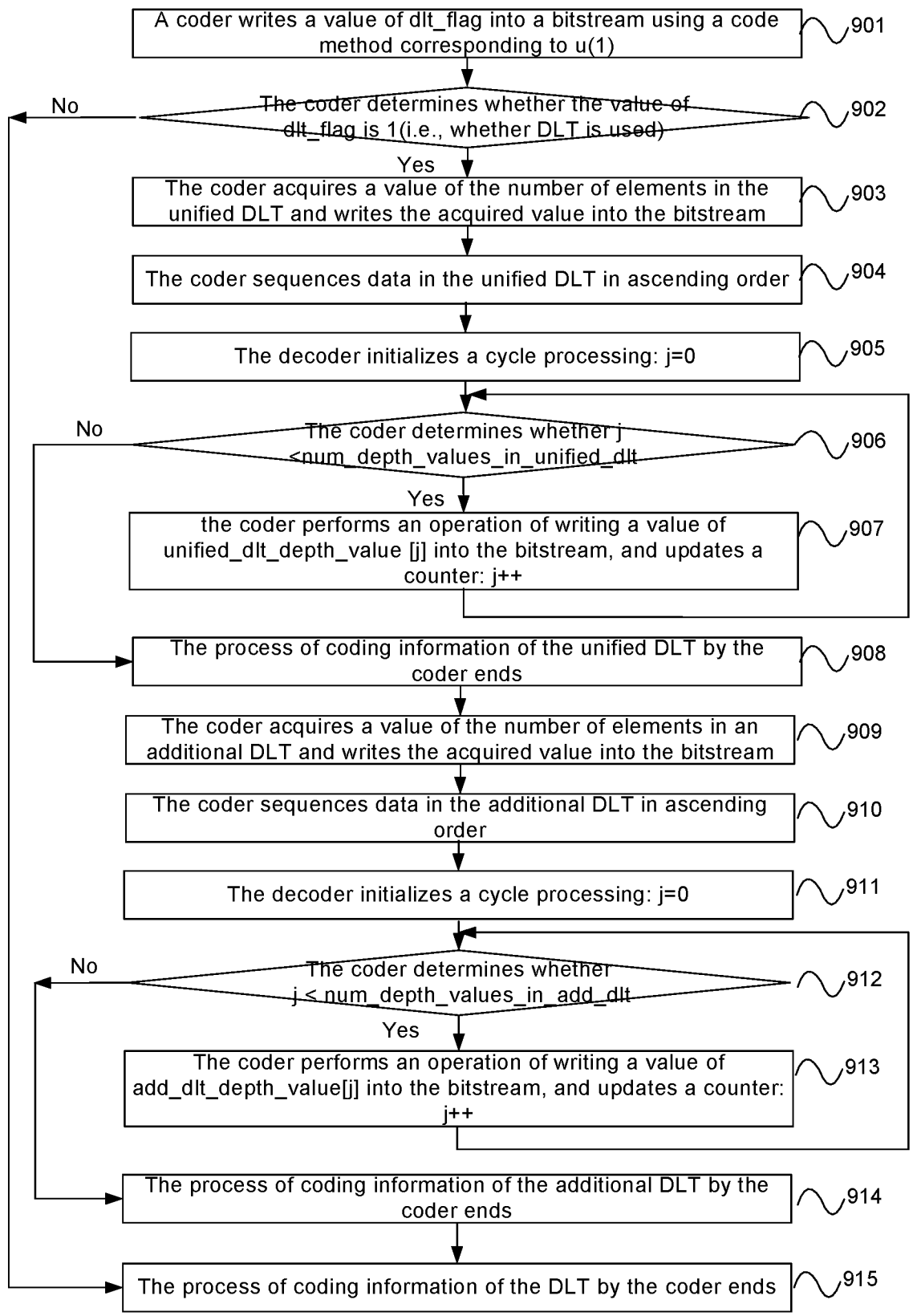
FIG. 9 is a second flow chart of a second embodiment of the disclosure.

A logic flow chart of a coder (or coding method) that uses the bitstream organization method according to the embodiment is as shown in FIG. 9.

Step 901, a coder writes a value of dlt_flag into a bitstream using a code method corresponding to u(1).

The coder determines according to an existing coder optimization technique whether a DLT is required to be used during coding. If a DLT is used, the value of dlt_flag is set to 1; otherwise, the value of dlt_flag is set to 0.

Step 902, the coder determines whether the value of dlt_flag is 1. If yes, proceed to step 903; otherwise, proceed to step 915.

Return to step 903, the coder acquires a value of the number of elements in a unified DLT and writes the acquired value into the bitstream.

The coder takes, as the unified DLT, the intersection of depth values in DLTs of all views, stores the unified DLT into an array, counts the number of valid elements included in the array and takes it as the value of the number of elements in the unified DLT.

Step 904, the coder sequences data in the unified DLT in ascending order.

Step 905, the decoder initializes a cycle processing: j=0.

Step 906, the coder determines whether j<num_depth_values_in_unified_dlt. If yes, proceed to step 907; otherwise, proceed to step 908.

Step 907, the coder performs an operation of writing a value of unified_dlt_depth_value [j] into the bitstream, and updates a counter: j++. Return to step 906.

alternatively, the coder writes the value of unified_dlt_depth_value [j] into the bitstream using a coding method corresponding to ue(v); or, alternatively, the coder writes the value of unified_dlt_depth_value [j] into the bitstream using a coding method corresponding to u(v).

Step 908, the process of coding information of the unified DLT by the coder ends.

Step 909, the coder acquires a value of the number of elements in an additional DLT and writes the acquired value into the bitstream.

The coder takes, as the additional DLT, remaining depth values in the DLT of the view other than depth values in the unified DLT, stores the additional DLT into an array, counts the number of valid elements included in the array and takes it as the value of the number of elements included in the additional DLT.

Step 910, the coder sequences data in the additional DLT in ascending order.

Step 911, the coder initializes a cycle processing: j=0.

Step 912, the coder determines whether j<num_depth_values_in_add_dlt. If yes, proceed to step 913; otherwise, proceed to step 914.

Step 913, the coder performs an operation of writing a value of add_dlt_depth_value [j] into the bitstream, and updates a counter: j++. Return to step 912.

The coder writes the value of add_dlt_depth_value [j] into the bitstream using a coding method corresponding to ue(v); or, alternatively, the coder writes the value of add_dlt_depth_value[j] into the bitstream using a coding method corresponding to u(v).

Step 914, the process of coding information of the additional DLT by the coder ends.

Step 915, the process of coding information of the DLT by the coder ends.

The coder according to the embodiment recovers the DLT of the view for coding depth information of all views that need a DLT, the DLT of the view is a union of add_dlt_depth_value and unified_dlt_depth_value.

Embodiment 3

In this embodiment, the unified DLT is defined as an intersection of depth values in DLTs of all views. Except the difference in the definition of the unified DLT, this embodiment is the same as embodiment 1 in terms of the bitstream organization method and the coder/decoder (coding and decoding method).

Embodiment 4

This embodiment is the same as embodiment 2 except the following items:

1. the unified DLT is defined as a union of depth values in DLTs of all views;

2. step 413 of the logic flow chart of the decoder according to embodiment 2 is modified as: the decoder recovers the DLT of the view, wherein the DLT of the view consists of remaining depth values in the unified DLT other than depth values in the DLT of the view; and 3. step 909 of the logic flow chart of the coder according to embodiment 2 is modified as: the coder acquires a value of the number of elements in an additional DLT and writes the calculated value into the bitstream.

The coder takes, as the additional DLT, remaining depth values in the unified DLT other than depth values in the DLT of the view, stores the additional DLT into an array, counts the number of valid elements included in the array and takes it as the value of the number of elements included in the additional DLT.

The coder according to the embodiment recovers the DLT of the view for coding depth information of all views that need a DLT, the DLT of the view is a difference between add_dlt_depth_value and unified_dlt_depth_value.

Embodiment 5

Figure 10:
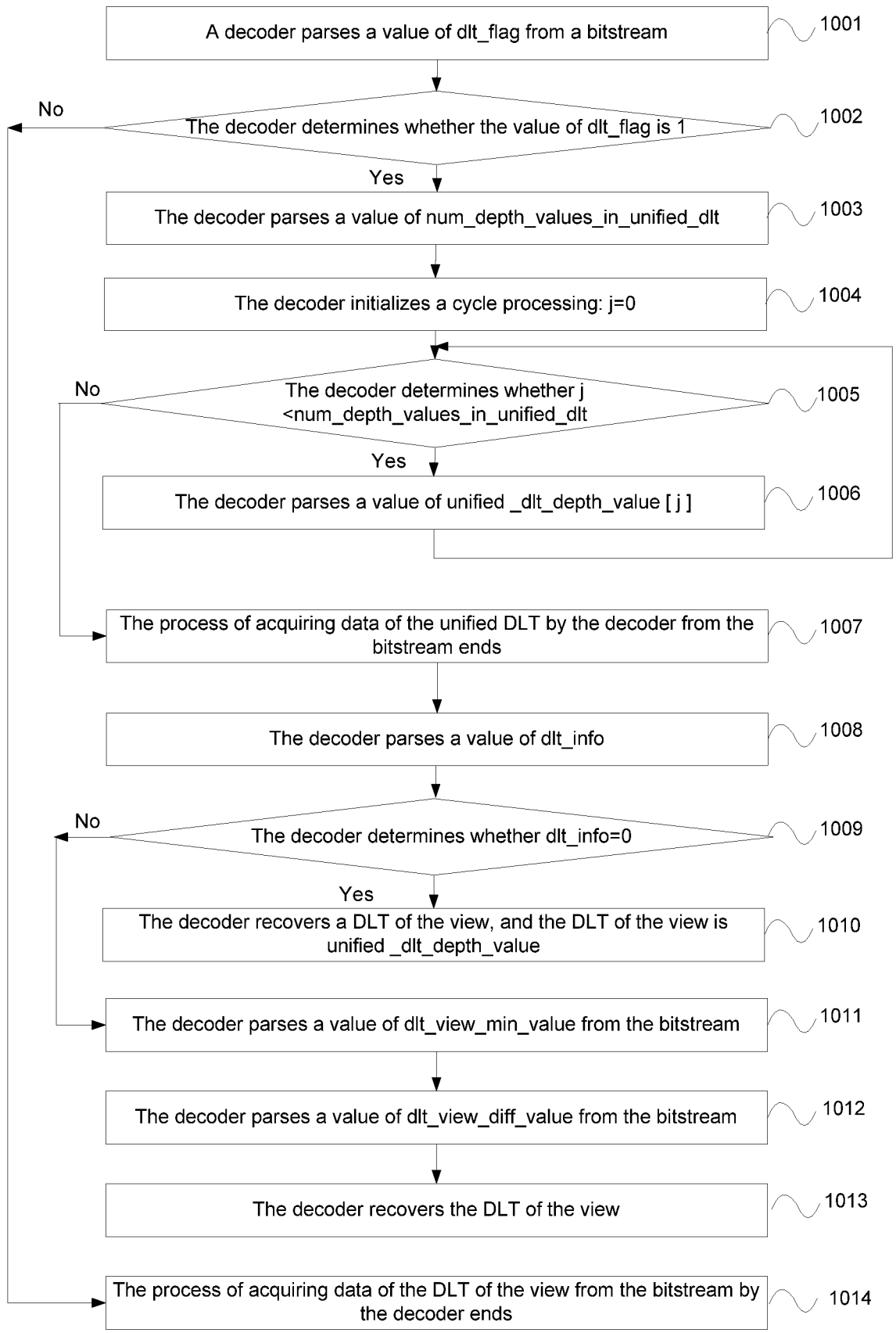
FIG. 10 is a first flow chart of a fifth embodiment of the disclosure.

A logic flow chart of a decoder (or decoding method) that uses the bitstream organization method according to the embodiment is as shown in FIG. 10.

Step 1001, a decoder parses a value of dlt_flag from a bitstream.

The decoder parses a bit field corresponding to dlt_flag from the bitstream using a decoding method corresponding to u(1) to acquire the value of dlt_flag.

Step 1002, the decoder determines whether the value of dlt_flag is 1. If yes, proceed to step 1003; otherwise, proceed to step 1014.

Step 1003, the decoder parses a value of num_depth_values_in_unified_dlt.

The decoder parses a bit field corresponding to num_depth_values_in_unified_dlt from the bitstream using a decoding method corresponding to ue(v) to acquire the value of num_depth_values_in_unified_dlt; or alternatively, the decoder parses a bit field corresponding to num_depth_values_in_unified_dlt from the bitstream using a decoding method corresponding to u(v) to acquire the value of num_depth_values_in_unified_dlt.

Step 1004, the decoder initializes a cycle processing: j=0.

Step 1005, the decoder determines whether j<num_depth_values_in_unified_dlt. If yes, proceed to step 1006; otherwise, proceed to step 1007.

Step 1006, the decoder parses a value of unified_dlt_depth_value [j].

The decoder parses a bit field corresponding to unified_dlt_depth_value [j] from the bitstream using a decoding method corresponding to ue(v) to acquire the value of unified_dlt_depth_value [j]; or the decoder parses a bit field corresponding to unified_dlt_depth value [j] from the bitstream using a decoding method corresponding to u(v) to acquire the value of unified_dlt_depth_value [j].

Step 1007, the process of acquiring data of the unified DLT by the decoder from the bitstream ends, the data of the unified DLT is stored in the array unified_dlt_depth_value.

Step 1008, the decoder parses a value of dlt_info.

The decoder parses a bit field corresponding to dlt_info from the bitstream using a decoding method corresponding to ue(v) to acquire the value of dlt_info.

Step 1009, the decoder determines whether dlt_info=0. If yes, proceed to step 1010; otherwise, proceed to step 1011.

Step 1010, the decoder recovers a DLT of the view, and the DLT of the view is unified_dlt_depth_value and stored in an array unified_dlt_depth_value.

Step 1011, the decoder acquires a value of dlt_view_min_value from the bitstream. The decoder parses a bit field corresponding to dlt_view_min_value from the bitstream using a decoding method corresponding to ue(v) to acquire the value of dlt_view_min_value.

Step 1012, the decoder acquires a value of dlt_view_diff_value from the bitstream. The decoder parses a bit field corresponding to dlt_view_diff_value from the bitstream using a decoding method corresponding to ue(v) to acquire the value of dlt_view_diff_value.

Step 1013, the decoder recovers the DLT of the view according to unified_dlt_depth_value, dlt_view_min_value and dlt_view_diff_value.

The DLT of the view is obtained by counting, in unified_dlt_depth_value, as many as dlt_view_diff_value values from dlt_view_min_value.

Step 1014, the process of acquiring data of the DLT of the view by the decoder from the bitstream ends.

The DLT acquired by parsing the bitstream by the decoder according to the embodiment is used to decode depth information of the view.

Figure 11:
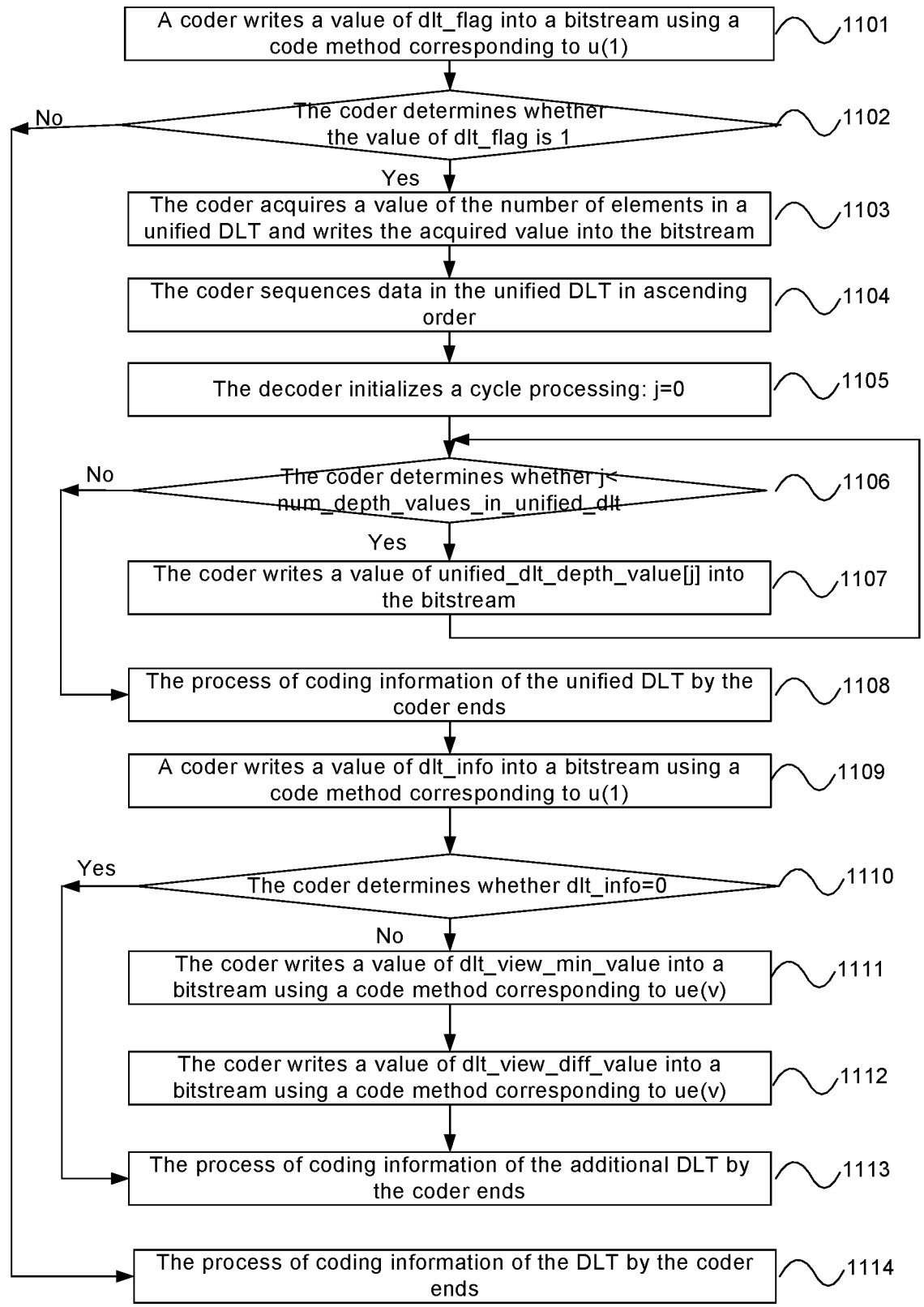
FIG. 11 is a second flow chart of a fifth embodiment of the disclosure.

A logic flow chart of a coder (or coding method) that uses the bitstream organization method according to the embodiment is as shown in FIG. 11.

Step 1101, a coder writes a value of dlt_flag into a bitstream using a code method corresponding to u(1).

The coder determines according to an existing coder optimization technique whether a DLT is required to be used during coding. If a DLT is used, the value of dlt_flag is set to 1; otherwise, the value of dlt_flag is set to 0.

Step 1102, the coder determines whether the value of dlt_flag is 1. If yes, proceed to step 1103; otherwise, proceed to step 1113.

Step 1103, the coder acquires a value of the number of elements in a unified DLT and writes the acquired value into the bitstream.

The coder takes, as the unified DLT, the union of depth values in DLTs of all views, stores the unified DLT into an array, counts the number of valid elements included in the array and takes it as the value of the number of elements in the unified DLT.

Step 1104, the coder sequences data in the unified DLT in ascending order.

Step 1105, the decoder initializes a cycle processing: j=0.

Step 1106, the coder determines whether j<num_depth_values_in_unified_dlt, if yes, proceed to step 1107; otherwise, proceed to step 1108.

Step 1107, the coder writes a value of unified_dlt_depth_value[j] into the bitstream, and updates a counter: j++. Return to step 1106.

alternatively, the coder writes the value of unified_dlt_depth_value [j] into the bitstream using a coding method corresponding to ue(v); or, alternatively, the coder writes the value of unified_dlt_depth_value [j] into the bitstream using a coding method corresponding to u(v).

Step 1108, the process of coding information of the unified DLT by the coder ends.

Step 1109, a coder writes a value of dlt_info into a bitstream using a code method corresponding to u(1).

If the DLT of the view and the unified DLT have the same maximum depth value and the same minimum depth value, the value of dlt_flag is set to 0; otherwise, the value of dlt_flag is set to 1.

Step 1110, the coder determines whether the value of dlt_info is 0. If yes, proceed to step 1114; otherwise, proceed to step 1111.

Step 1111, the coder writes a value of dlt_view_min_value into a bitstream using a code method corresponding to ue(v). dlt_view_min_value is a location in the unified DLT corresponding to a minimum depth value in the original DLT of the view.

Step 1112, the coder writes a value of dlt_view_diff_value into a bitstream using a code method corresponding to ue(v). dlt_view_diff_value is a difference in locations in the unified DLT corresponding to a minimum depth value and a maximum depth value in the DLT of the view.

Step 1113, the process of coding information of the additional DLT by the coder ends.

Step 1114, the process of coding information of the DLT by the coder ends.

The DLT of the view recovered in the embodiment is used to code depth information of the view, wherein the DLT of the view is obtained by counting, in unified_dlt_depth_value, as many as dlt_view_diff_value values from dlt_view_min_value.

Embodiment 6

This embodiment is the same as embodiment 5 except the following items:

1. dlt_view_min_value is defined as a minimum depth value in the DLT of the view;

2. dlt_view_diff_value is changed to dlt_view_max_value that is defined as a maximum depth value in the DLT of the view; and 3. Step 613 of the logic flow chart of the decoder according to embodiment 2 is modified to: the decoder recovers the DLT of the view according to unified_dlt_depth_value, dlt_view_min_value and dlt_view_max_value. The DLT of the view includes all depth values obtained by counting, in unified_dlt_depth_value, as many as dlt_view_max_value values from dlt_view_min_value.

The DLT of the view recovered in the embodiment is used to code depth information of the view, wherein the DLT of the view is obtained by counting, in unified_dlt_depth_value, as many as dlt_view_max_value values from dlt_view_min_value.

Embodiment 7

Figure 12:
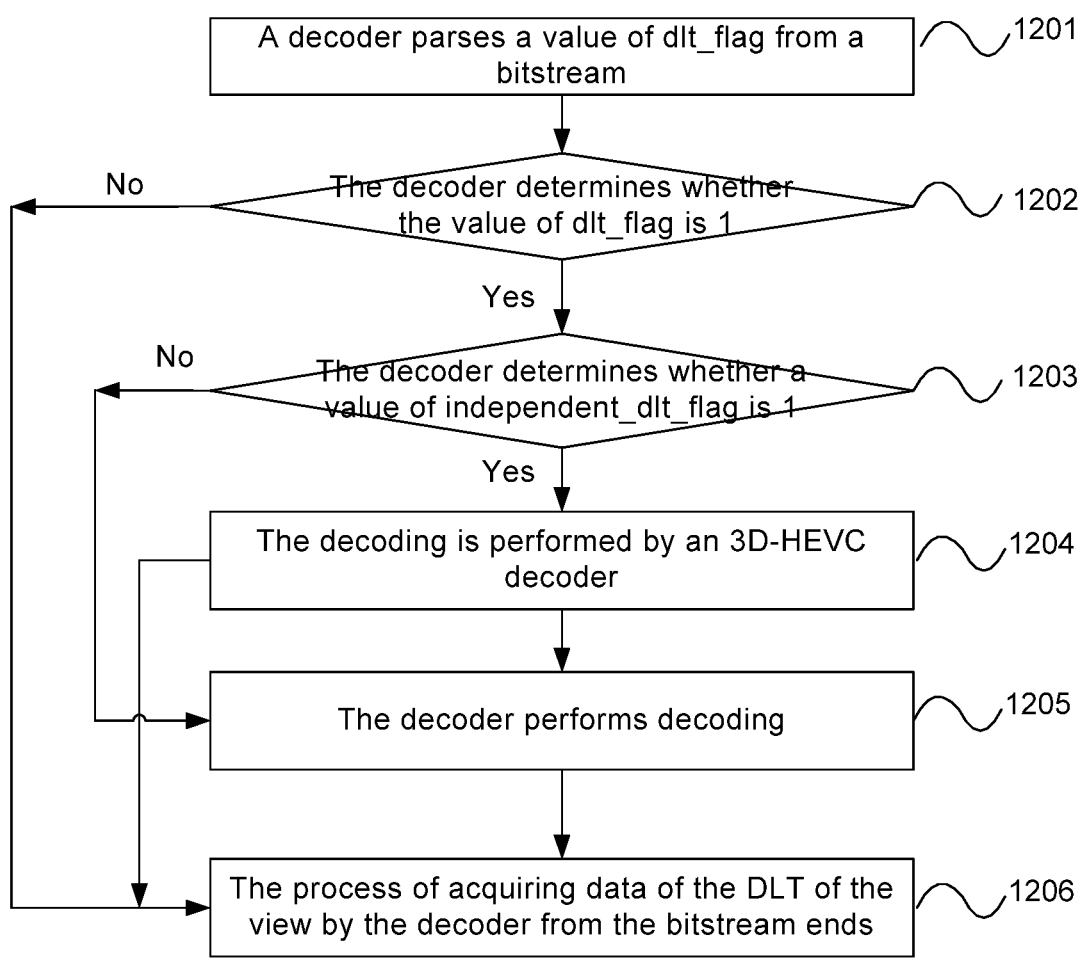
FIG. 12 is a first flow chart of a seventh embodiment of the disclosure.

A logic flow chart of a decoder (or decoding method) that uses the bitstream organization method according to the embodiment is as shown in FIG. 12.

Step 1201, a decoder parses a value of dlt_flag from a bitstream.

The decoder parses a bit field corresponding to dlt_flag from the bitstream using a decoding method corresponding to u(1) to acquire the value of dlt_flag.

Step 1202, the decoder determines whether the value of dlt_flag is 1. If yes, proceed to step 1203; otherwise, proceed to step 1206.

Step 1203, the decoder parses a value of independent_dlt_flag from a bitstream.

The decoder parses a bit field corresponding to independent_dlt_flag from the bitstream using a decoding method corresponding to u(1) to acquire the value of independent_dlt_flag.

Step 1203, the decoder determines whether the value of independent_dlt_flag is 1. If yes, proceed to step 1204; otherwise, proceed to step 1205.

Step 1204, the decoding is performed by an 3D-HEVC decoder.

Step 1205, the decoding is performed by a decoder according to embodiment 2.

Step 1206, the process of acquiring data of the DLT of the view by the decoder from the bitstream ends.

The DLT acquired by parsing the bitstream by the decoder according to the embodiment is used to decode depth information of the view.

Figure 13:
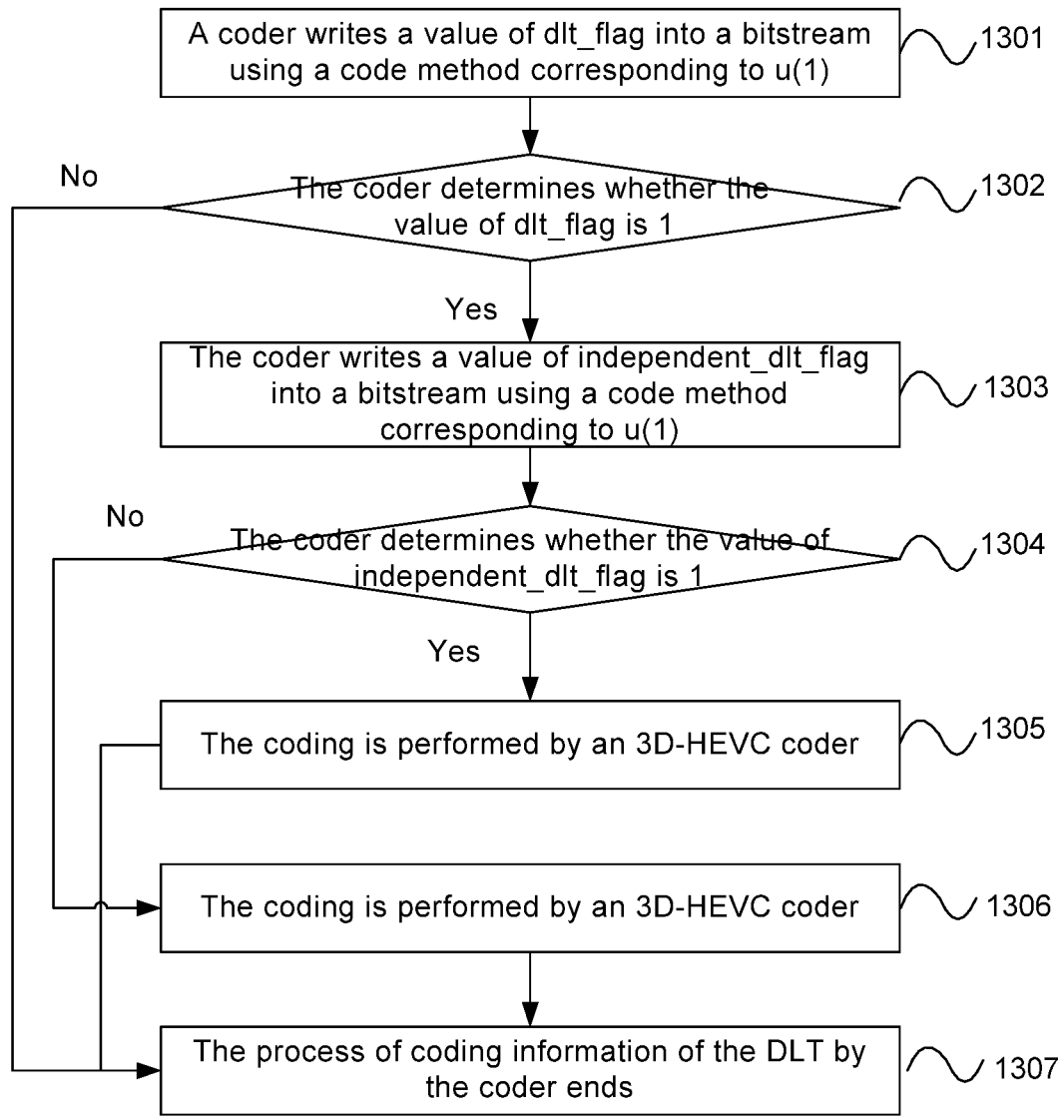
FIG. 13 is a second flow chart of a seventh embodiment of the disclosure.

A logic flow chart of a coder (or coding method) that uses the bitstream organization method according to the embodiment is as shown in FIG. 13.

Step 1301, a coder writes a value of dlt_flag into a bitstream using a code method corresponding to u(1).

The coder determines according to an existing coder optimization technique whether a DLT is required to be used during coding. If a DLT is used, the value of dlt_flag is set to 1; otherwise, the value of dlt_flag is set to 0.

Step 1302, the coder determines whether the value of dlt_flag is 1. If yes, proceed to step 1303; otherwise, proceed to step 1307.

Step 1303, the coder writes a value of independent_dlt_flag into a bitstream using a code method corresponding to u(1).

The coder determines according to an existing coder optimization technique whether an independent DLT is used by the view during the coding rather than the DLT of the view is recovered from the unified DLT and the additional DLT. If the independent DLT is used, a value of independent_dlt_flag is set to 1; otherwise, the value of independent_dlt_flag is set to 0.

Step 1304, the coder determines whether the value of independent_dlt_flag is 1. If yes, proceed to step 1305; otherwise, proceed to step 1306.

Step 1305, the coding is performed by an 3D-HEVC coder.

Step 1306, the coding is performed by a coder according to embodiment 2.

Step 1307, the process of coding information of the DLT by the coder ends.

In the embodiment, the DLT of the view is recovered according to independent_dlt_flag and the DLT of the view is used to code depth information of the view.

Embodiment 8

This embodiment is the same as embodiment 7 except the following items:

1. step 1205 of the logic flow chart of the decoder according to embodiment 7 is modified as: the decoding is performed by a decoder according to embodiment 4; and 2. step 1306 of the logic flow chart of the coder according to embodiment 7 is modified as: the coding is performed by a coder according to embodiment 4.

Embodiment 9

This embodiment is the same as embodiment 7 except the following items:

1. step 1205 of the logic flow chart of the decoder according to embodiment 7 is modified as: the decoding is performed by a decoder according to embodiment 1; and 2. step 1306 of the logic flow chart of the coder according to embodiment 7 is modified as: the coding is performed by a coder according to embodiment 1.

Embodiment 10

This embodiment is the same as embodiment 7 except the following items:

1. step 1205 of the logic flow chart of the decoder according to embodiment 7 is modified as: the decoding is performed by a decoder according to embodiment 3; and 2. step 1306 of the logic flow chart of the coder according to embodiment 7 is modified as: the coding is performed by a coder according to embodiment 3.

Embodiment 11

This embodiment is the same as embodiment 7 except the following items:

1. step 1205 of the logic flow chart of the decoder according to embodiment 7 is modified as: the decoding is performed by a decoder according to embodiment 5; and 2. step 1306 of the logic flow chart of the coder according to embodiment 7 is modified as: the coding is performed by a coder according to embodiment 5.

Embodiment 12

This embodiment is the same as embodiment 7 except the following items:

1. step 1205 of the logic flow chart of the decoder according to embodiment 7 is modified as: the decoding is performed by a decoder according to embodiment 6; and 2. step 1306 of the logic flow chart of the coder according to embodiment 7 is modified as: the coding is performed by a coder according to embodiment 6.

Embodiment 13

The coder or decoder can be a generation device for related bitstreams and a reception and playing device for related bitstreams in video communication applications, such as a mobile phone, a computer, a server, a set-top-box, a portal mobile terminal, a digital camera, a TV and broadcasting system device and the like.

Embodiment 14

Figure 14:
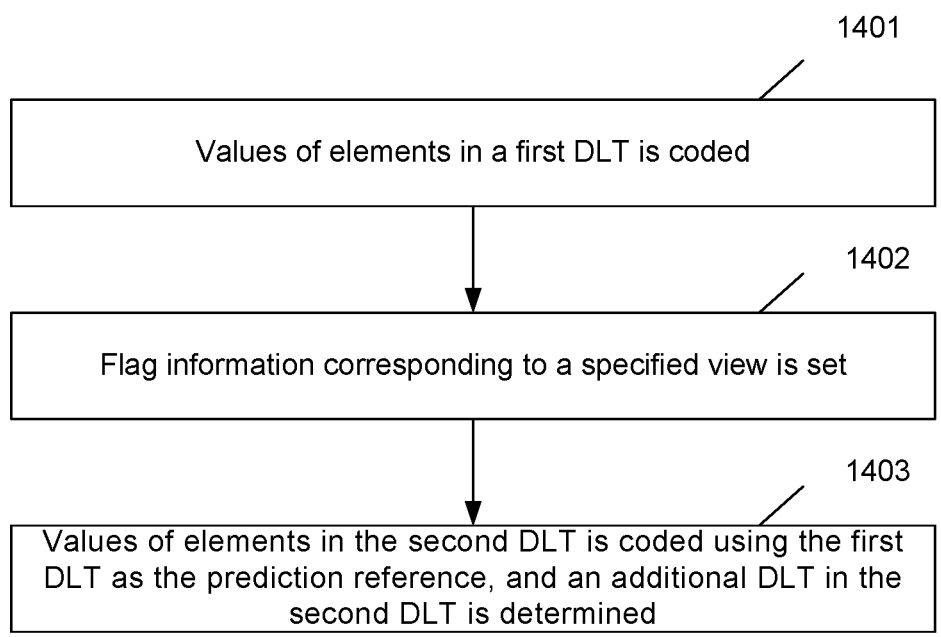
FIG. 14 is a flow chart for a coding process according to a fourteenth embodiment of the disclosure.

A logic flow chart of a coder (or coding method) according to the embodiment is as shown in FIG. 14, and it includes:

step 1401, values of elements in a first DLT are coded;

Herein the first DLT in this embodiment has same function as those of unified DLTs in above embodiments.

Specifically, the coder acquires a value of the number of elements in the first DLT and writes the acquired value into a bitstream.

The coder takes the intersection of depth values in DLTs of all views as the first DLT, namely the aforementioned unified DLT in above embodiments; the coder stores the first DLT into an array, counts the number of valid elements included in the array and takes it as the value of the number of elements included in the first DLT;

the coder sequences data in the first DLT in ascending order, and then initializes a cycle processing: j=0;

it is determined whether j<num_depth_values_in_unified_dlt (the number of elements included in the first DLT), if yes, the coder writes a coding bit of unified_dlt_depth_value[j] (a jth element of the first DLT) into the bitstream; the coder updates a counter: j++;

if no, the coder writes the coding bit of the first DLT into the bitstream using coding methods corresponding to ue(v) or u(v).

Step 1402, flag information corresponding to a specified view is set, and whether the first DLT is used as prediction reference to code a second DLT is indicated by the flag information;

step 1403, when it is determined according to the flag information that the first DLT is used as the prediction reference to code the second DLT, values of elements in the second DLT are coded using the first DLT as the prediction reference, and an additional DLT in the second DLT is determined;

when it is determined according to the flag information that the first DLT is not used as the prediction reference to code the second DLT, the values of the elements in the second DLT are coded directly without referencing other DLT(s).

Specifically, the coder takes, as the second DLT, remaining depth values in a DLT of a specified view other than depth values in the first DLT, stores the second DLT into an array, counts the number of valid elements included in the array and takes it as the value of the number of elements included in the second DLT;

the coder sequences data in the second DLT in ascending order, and then initializes a cycle processing: j=0;

The coder writes a value of the second DLT, i.e., add_dlt_depth_value [j] into the bitstream.

Preferably, after completion of above step 1402, the method may further include: depth information of the specified view is coded using the first DLT and/or the second DLT. The coding belongs to prior arts, detailed description of which will be omitted herein.

The flag information can be a flag bit, for example 1 or 0, and it can be defined specifically that when the flag bit is 1, it is determined that the flag information indicates usage of the first DLT as the prediction reference to code the second DLT.

Further, before above step 1403 is implemented, the method may further include: an additional DLT is constructed using the first DLT and the second DLT.

The constructing of the additional DLT includes: an element existing in the second DLT but not included in the first DLT is determined as an element in the additional DLT.

The method for constructing the second DLT is the same as that for the first DLT, detailed description of which will be omitted herein.

After the values of the elements in the second DLT are coded using the first DLT as the prediction reference, the method may further include: a coding bit of the additional DLT is written into a parameter set bitstream.

Further, when it is determined according to the flag information that the first DLT is not used as the prediction reference to code the second DLT, the values of the elements in the second DLT are coded directly without referencing other DLT(s) and a coding bit of the second DLT is written into the parameter set bitstream.

Preferably, before above step 1401 is implemented, the method may further include: values of elements in a DLT used by each view is determined.

The embodiment will be further elaborated below.

It is assumed that the first DLT is DLT[0][ ] and the second DLT is DLT[1][ ]; values of elements in both DLTs have been sequenced in ascending order, there are not repeated elements and the numbers of elements included respectively in both DLTs are DltSize[0] and DltSize[1]; an additional DLT in the second DLT is deltaDLT[1][ ] and the number of elements included in the additional DLT is deltaDltSize[1]. An element existing in DLT[1][ ] but not existing in DLT[0][ ] is taken as an element in deltaDLT[1][ ];

then the process of determining values of elements in the additional DLT can be shown as follows.

```
j =0;
k = 0;
for ( i = 0; i < DltSize[1]; i ++)
{
  if ( DLT[1][i] > DLT[0][DltSize[0]-1])
  {
    deltaDLT[1][k] = DLT[1][i];
    k ++;
  }
  Else
  {
    while ( DLT[1][i] < DLT[0][j] )
      j ++;
    if ( DLT[1][i] != DLT[0][j] )
    {
      deltaDLT[1][k] = DLT[1][i];
      k ++;
    }
  }
}
deltaDltSize[1] = k;
```

In addition, it may further include:

NumBitsDLT[0]=EntropyCoder (DLT[0], DltSize[0]); actual coding is performed on the first DLT, and the number of coding bits is returned. EntropyCoder( ) belongs to prior arts.

NumBitsDLT[1]=CountingBits (DLT[1], DltSize[1]); the number of coding bits required to code directly the second DLT without referencing other DLT(s) is calculated, which is not actually coded. CountingBits( ) belongs to prior arts.

NumBitsDeltaDlt[1]=CountingBits (deltaDLT[1], deltaDltSize[1]); the number of coding bits required to code the additional DLT is calculated, which is not actually coded.

```
if (NumBitsDLT[1] > NumBitsDeltaDlt[1])
{
  EntropyCoder(1); // a flag bit of the additional DLT is used to code
  NumBitsDeltaDlt[1] = EntropyCoder(deltaDLT[1], deltaDltSize[1] );
}
else
{
  EntropyCoder(0); // a flag bit of the additional DLT is not used to code
  NumBitsDLT[1] = EntropyCoder( DLT[1], DltSize[1] );
}。
```

Figure 15:
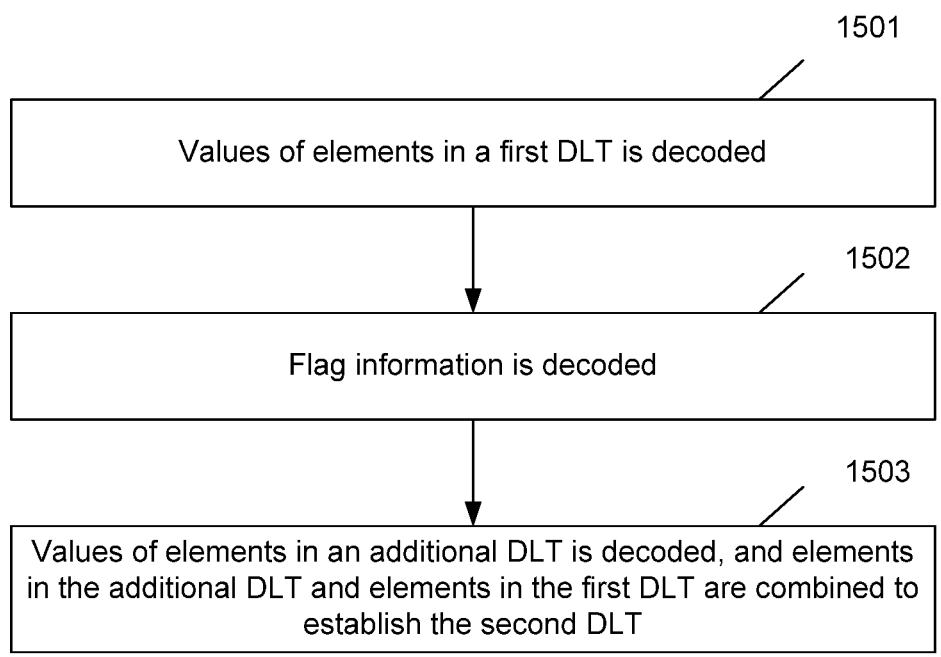
FIG. 15 is a flow chart for a decoding process according to a fourteenth embodiment of the disclosure.

The embodiment further provides a decoder (or decoding method), the logic flow chart of a decoder (or decoding method) that uses is as shown in FIG. 15, and the decoding method includes:

step 1501, values of elements in a first DLT are decoded;

step 1502, flag information is decoded, and it is determined according to the flag information whether the first DLT is used as a prediction reference to decode a second DLT;

step 1503, when it is determined according to the flag information that the first DLT is used as the prediction reference to decode the second DLT, values of elements in an additional DLT are decoded, and elements in the additional DLT and elements in the first DLT are combined to establish the second DLT.

Herein in step 1502, the determination can be made by parsing the flag information to determine whether the first DLT is used as the prediction reference to decode the second DLT, for example, the flag information can be a flag bit with its value being 1 or 0, assuming that when the flag bit is 1, it is determined according to the definition of the flag bit that the flag information indicates usage of the first DLT as the prediction reference to decode the second DLT.

After completion of above step 1503, the method may further include: depth information of a specified view is decoded using the first DLT and/or the second DLT.

The element of the additional DLT is an element existing in the second DLT but not included in the first DLT.

Before the values of the elements in the first DLT are decoded, information of the number of elements included in the first DLT is decoded.

Before the values of the elements in the additional DLT are decoded according to the decoded flag information obtained in step 1502, information of the number of elements included in the additional DLT is decoded, a sum of the number of elements in the additional DLT and the number of elements in the first DLT is set as a value of the number of elements in the second DLT; or before the values of the elements in the second DLT are decoded, information of the number of elements included in the second DLT is decoded.

Embodiment 15

Figure 16:
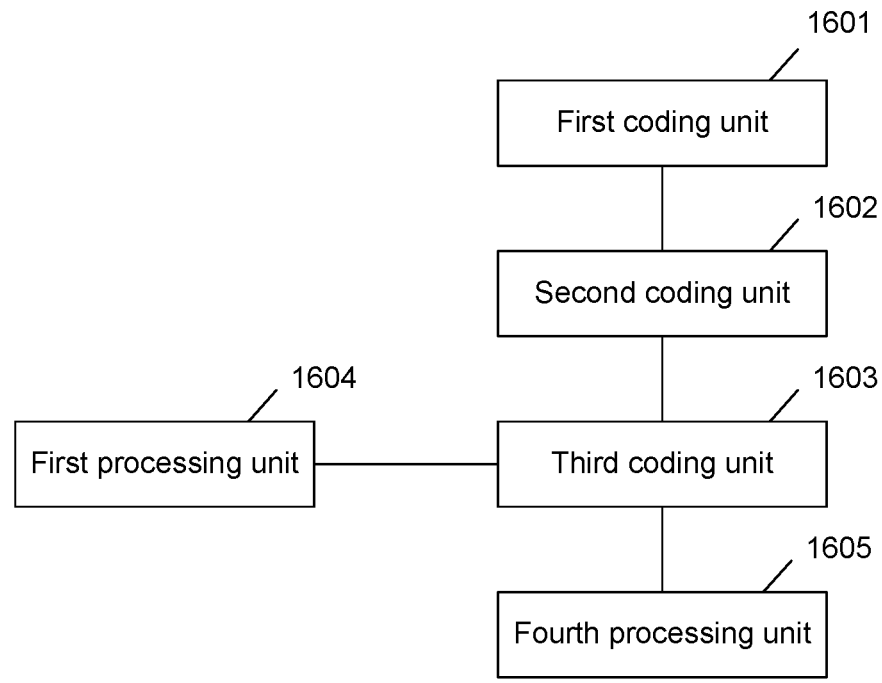
FIG. 16 is a schematic structural diagram of a coder according to a fifteenth embodiment of the disclosure.

A coder according to an embodiment of the disclosure is as shown in FIG. 16, and the coder includes:

a first coding unit 1601 configured to code values of elements in a first Depth Look-up Table (DLT);

a second coding unit 1602 configured to code flag information corresponding to a specified view and indicate by the flag information whether the first DLT is used as prediction reference to code a second DLT; and a third coding unit 1603 configured to, when it is determined according to the flag information that the first DLT is used as the prediction reference to code the second DLT, code values of elements in the second DLT using the first DLT as the prediction reference.

The coder may further include a first processing unit 1604 configured to construct an additional DLT using the first DLT and the second DLT.

The first processing unit 1604 is specifically configured to determine, as an element in the additional DLT, an element existing in the second DLT but not included in the first DLT.

The first processing unit 1601 is further configured to, before coding the values of the elements in the first DLT, code the number of elements included in the first DLT;

The third processing unit 1603 may be further configured to, before coding values of elements in the additional DLT, code the number of elements included in the additional DLT.

The third processing unit 1603 is further configured to, when it is determined according to the flag information indicating that the first DLT is not used as the prediction reference to code the second DLT, code directly the values of the elements in the second DLT without referencing other DLT(s) and writing a coding bit of the second DLT into the parameter set bitstream.

The coder may further include a fourth coding unit 1605 configured to code depth information of a specified view using the first DLT and/or the second DLT.

Figure 17:
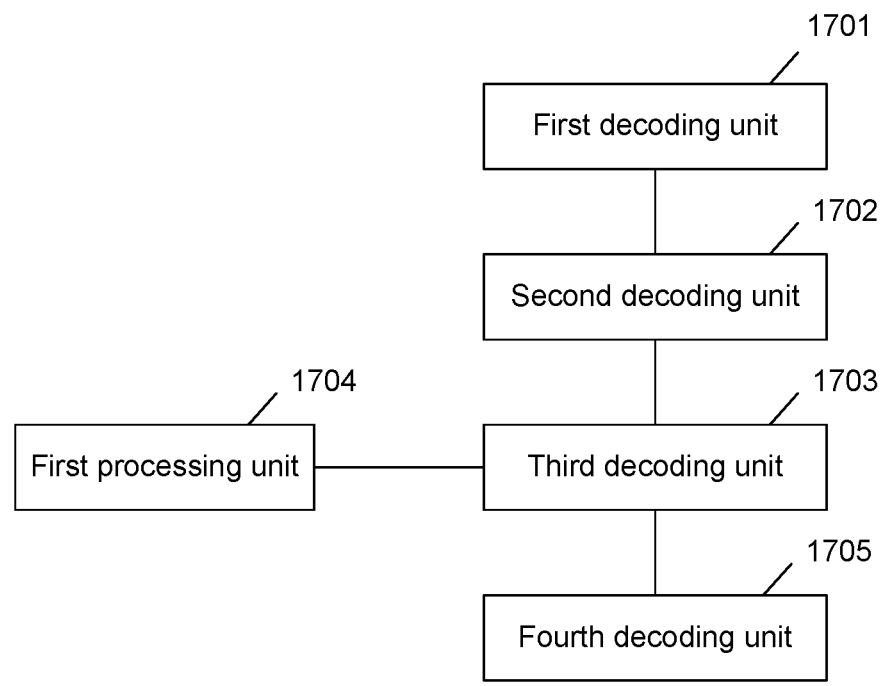
FIG. 17 is a schematic structural diagram of a decoder according to a fifteenth embodiment of the disclosure.

Accordingly, an embodiment of the disclosure provides a decoder as shown in FIG. 17, and the decoder includes:

a first decoding unit 1701 configured to decode values of elements in a first DLT;

a second decoding unit 1702 configured to decode flag information and determine according to the flag information whether the first DLT is used as prediction reference to decode a second DLT; and a third decoding unit 1703 configured to, when it is determined according to the flag information that the first DLT is used as the prediction reference to decode the second DLT, decode values of elements in an additional DLT, and combine elements in the additional DLT and elements in the first DLT and determine combined elements as elements of the second DLT.

The first decoding unit 1701 is further configured to, before decoding the values of the elements in the first DLT, decode information of the number of elements included in the first DLT.

The third decoding unit 1703 is further configured to, before decoding the values of the elements in the additional DLT, decode the number of elements included in the additional DLT.

The third decoding unit 1703 is further configured to, before decoding values of elements in the second DLT, decode the number of elements included in the second DLT.

The decoder further includes a first processing unit 1704 configured to set, as a value of the number of elements included in the second DLT, a sum of the number of elements included in the additional DLT and the number of elements included in the first DLT.

The decoder further includes a fourth decoding unit 1705 configured to decode depth information of a specified view using the first DLT and/or the second DLT.

An embodiment of the disclosure further provides a system for coding and decoding depth information, and the system includes an aforementioned coder and an aforementioned decoder, detailed description of which will be omitted herein.

What described are merely preferable embodiments of the disclosure, and are not intended to limit the disclosure.

The invention claimed is:

1. A method for coding depth information, comprising:
   acquiring a value of a number of elements included in a first Depth Look-up Table (DLT), coding the value of the number of the elements included in the first DLT and coding values of the elements included in the first DLT, and writing coding bits of the first DLT into a bitstream of a parameter set;
   coding flag information corresponding to a specified view, and indicating by the flag information whether the first DLT is used as a prediction reference to code a second DLT;
   when it is determined according to the flag information that the first DLT is used as the prediction reference to code the second DLT, coding values of elements included in the second DLT using the first DLT as the prediction reference; and
   when it is determined according to the flag information that the first DLT is not used as the prediction reference to code the second DLT, coding a value of a number of the elements included in the second DLT, coding directly the values of the elements included in the second DLT without referencing other DLT(s) including the first DLT, and writing coding bits of the second DLT into the bitstream of the parameter set;
   wherein coding the values of the elements included in the second DLT using the first DLT as the prediction reference comprises:
     constructing an additional DLT using the first DLT and the second DLT;
     coding a value of a number of elements included in the additional DLT;
     coding values of the elements included in the additional DLT; and
     writing coding bits of the additional DLT into the bitstream of the parameter set.

2. A method for decoding depth information, comprising:
   decoding a value of a number of elements included in a first Depth Look-up Table (DLT);
   decoding values of the elements included in the first DLT;
   decoding flag information, and determining according to the flag information whether the first DLT is used as a prediction reference to decode a second DLT;
   when it is determined according to the flag information that the first DLT is used as the prediction reference to decode the second DLT, decoding values of elements included in an additional DLT, and combining the elements included in the additional DLT and the elements included in the first DLT to establish the second DLT; and
   when it is determined according to the flag information that the first DLT is not used as the prediction reference to decode the second DLT, decoding a bitstream of a parameter set to obtain a value of a number of elements included in the second DLT and values of the elements included in the second DLT;

wherein decoding the values of the elements included in the additional DLT comprises: decoding the bitstream of the parameter set to obtain a value of a number of the elements included in the additional DLT and the values of the elements included in the additional DLT.

3. The method according to claim 2, further comprising: setting, as the value of the number of the elements included in the second DLT, a sum of the number of the elements included in the additional DLT and the number of the elements included in the first DLT.

4. A coder comprising:
a first coding unit configured to acquire a value of a number of elements included in a first Depth Look-up Table (DLT), code the value of the number of the elements included in the first DLT and code values of the elements included in the first DLT, and write coding bits of the first DLT into a bitstream of a parameter set;
a second coding unit configured to code flag information corresponding to a specified view and indicate by the flag information whether the first DLT is used as a prediction reference to code a second DLT; and
a third coding unit configured to, when it is determined according to the flag information that the first DLT is used as the prediction reference to code the second DLT, code values of elements included in the second DLT using the first DLT as the prediction reference, and when it is determined according to the flag information that the first DLT is not used as the prediction reference to code the second DLT, code directly the values of the elements included in the second DLT without referencing other DLT(s) including the first DLT, and write coding bits of the second DLT into the bitstream of the parameter set;
wherein the coder further comprises:
a first processing unit configured to construct an additional DLT using the first DLT and the second DLT;

wherein the third coding unit is further configured to, code a value of a number of elements included in the additional DLT, code values of the elements included in the additional DLT, and write coding bits of the additional DLT into the bitstream of the parameter set.

5. A decoder comprising:
a first decoding unit configured to decode a value of a number of elements included in a first Depth Look-up Table (DLT) and decode values of the elements included in the first DLT;
a second decoding unit configured to decode flag information and determine according to the flag information whether the first DLT is used as a prediction reference to decode a second DLT; and
a third decoding unit configured to, when it is determined according to the flag information that the first DLT is used as the prediction reference to decode the second DLT, decode values of elements included in an additional DLT, and combine the elements included in the additional DLT and the elements included in the first DLT to establish the second DLT, and when it is determined according to the flag information that the first DLT is not used as the prediction reference to decode the second DLT, decode a bitstream of a parameter set to obtain a value of a number of elements included in the second DLT and values of the elements included in the second DLT;
wherein the third decoding unit is further configured to decode the bitstream of the parameter set to obtain a value of a number of the elements included in the additional DLT and the values of the elements included in the additional DLT.

6. The decoder according to claim 5, further comprising:
a first processing unit configured to set, as the value of the number of the elements included in the second DLT, a sum of the number of the elements included in the additional DLT and the number of the elements included in the first DLT.

* * * * *